US012462850B2

United States Patent
Bhooshan et al.

(10) Patent No.: US 12,462,850 B2
(45) Date of Patent: Nov. 4, 2025

(54) SYSTEM AND METHOD FOR IMPROVING SAFETY OF INTEGRATED CIRCUITS

(71) Applicant: NXP B.V., Eindhoven (NL)

(72) Inventors: Rishi Bhooshan, Greater Noida (IN); Hubert Martin Bode, Haar (DE); Shilpa Gupta, Delhi (IN); Alexander Hoefler, Austin, TX (US)

(73) Assignee: NXP B.V., Eindhoven (NL)

( * ) Notice: Subject to any disclaimer, the term of this patent is extended or adjusted under 35 U.S.C. 154(b) by 113 days.

(21) Appl. No.: 18/435,286

(22) Filed: Feb. 7, 2024

(65) Prior Publication Data

US 2025/0201279 A1 Jun. 19, 2025

(30) Foreign Application Priority Data

Dec. 14, 2023 (IN) .............................. 202341085557

(51) Int. Cl.
 *G11C 8/00* (2006.01)
 *G11C 5/00* (2006.01)
 *G11C 11/413* (2006.01)

(52) U.S. Cl.
 CPC ............ *G11C 5/005* (2013.01); *G11C 11/413* (2013.01)

(58) Field of Classification Search
 CPC .............................. G11C 5/005; G11C 11/413
 USPC ..................................................... 365/230.02
 See application file for complete search history.

(56) References Cited

U.S. PATENT DOCUMENTS

| | | | | |
|---|---|---|---|---|
| 6,799,288 B2 * | 9/2004 | Kohnen | ................. | G11C 29/42 |
| | | | | 714/764 |
| 6,943,578 B1 * | 9/2005 | Sanda | ................. | G01R 31/308 |
| | | | | 702/117 |
| 7,501,849 B2 * | 3/2009 | Perisetty | ................. | H03K 19/00315 |
| | | | | 326/38 |
| 8,791,679 B2 * | 7/2014 | Gagne | ................. | H02H 9/046 |
| | | | | 323/283 |
| 9,112,495 B1 * | 8/2015 | Clark | ................. | G11C 5/146 |

(Continued)

FOREIGN PATENT DOCUMENTS

| JP | 2001228219 A | * | 8/2001 | ......... G01R 31/2853 |
| JP | 2010045182 A | * | 2/2010 | ........... H10D 84/854 |

OTHER PUBLICATIONS

Ragshav, "Steps to Diagnose Latch-Up Issues in VLSI Systems", ChipEdge, https://chipedge.com/resources/steps-to-diagnose-latch-up-issues-in-vlsi-systems/ (Year: 9202).*

(Continued)

*Primary Examiner* — Viet Q Nguyen

(57) ABSTRACT

An integrated circuit (IC) for detecting single event latch-ups (SELs) includes a plurality of wells of a memory circuit and a detection circuit. The detection circuit includes a selection circuit, a comparison circuit, and a fault collection and control management circuit. The selection circuit selects a well of the plurality of wells to sense a voltage or a current in the selected well. The well is selected based on a select signal that indicates a location of the well. The comparison circuit compares the sensed voltage or current with a predetermined threshold to generate a fault signal that may be indicative of the SEL in the selected well. The SEL may be indicative of a fault in the memory circuit. The fault collection and control management circuit determines corrective actions based on the detection of the location of the SEL.

20 Claims, 9 Drawing Sheets

(56) References Cited

U.S. PATENT DOCUMENTS

| | | | |
|---|---|---|---|
| 9,819,258 B1* | 11/2017 | Vandam | G01R 31/31816 |
| 9,960,593 B2 | 5/2018 | Vail et al. | |
| 10,566,780 B2* | 2/2020 | Chang | H02H 3/44 |
| 10,886,723 B2 | 1/2021 | Vail et al. | |
| 11,435,399 B2* | 9/2022 | Sternberg | G01R 31/2656 |
| 11,695,539 B1* | 7/2023 | Modi | H04L 7/0079 |
| | | | 375/376 |
| 2006/0022229 A1 | 2/2006 | Sumita | |
| 2008/0150575 A1 | 6/2008 | Perisetty | |
| 2012/0170394 A1 | 7/2012 | Kim et al. | |
| 2013/0335875 A1* | 12/2013 | Baumann | G11C 5/005 |
| | | | 361/111 |
| 2016/0295147 A1 | 10/2016 | Tashiro et al. | |
| 2023/0393945 A1* | 12/2023 | Graczyk | G06F 11/0793 |

OTHER PUBLICATIONS

Sangiorgi, "Latch-up testing in CMOS IC's", IEEE Journal of Solid-state Circuits, https://www.academia.edu/27129745/Latch_up_testing_in_CMOS_ICs (Year: 1990).*

Moya, "Single Event Latch-up protection circuits". IEEE Components, Power & Circuit Protection, https://www.doeeet.com/content/eee-components/power-circuit-protection/single-event-latchup-protection-circuits/ (Year: 1990).*

Burnell et al., "Laser SEL Sensitivity Mapping of SRAM Cells," in IEEE Transactions on Nuclear Science, Aug. 2010, pp. 1973-1977, vol. 57, No. 4, IEEE.

Miki et al., "Si-Backside Protection Circuits Against Physical Security Attacks on Flip-Chip Devices," in IEEE Journal of Solid-State Circuits, Oct. 2020, pp. 2747-2755, vol. 55, No. 10, IEEE.

\* cited by examiner

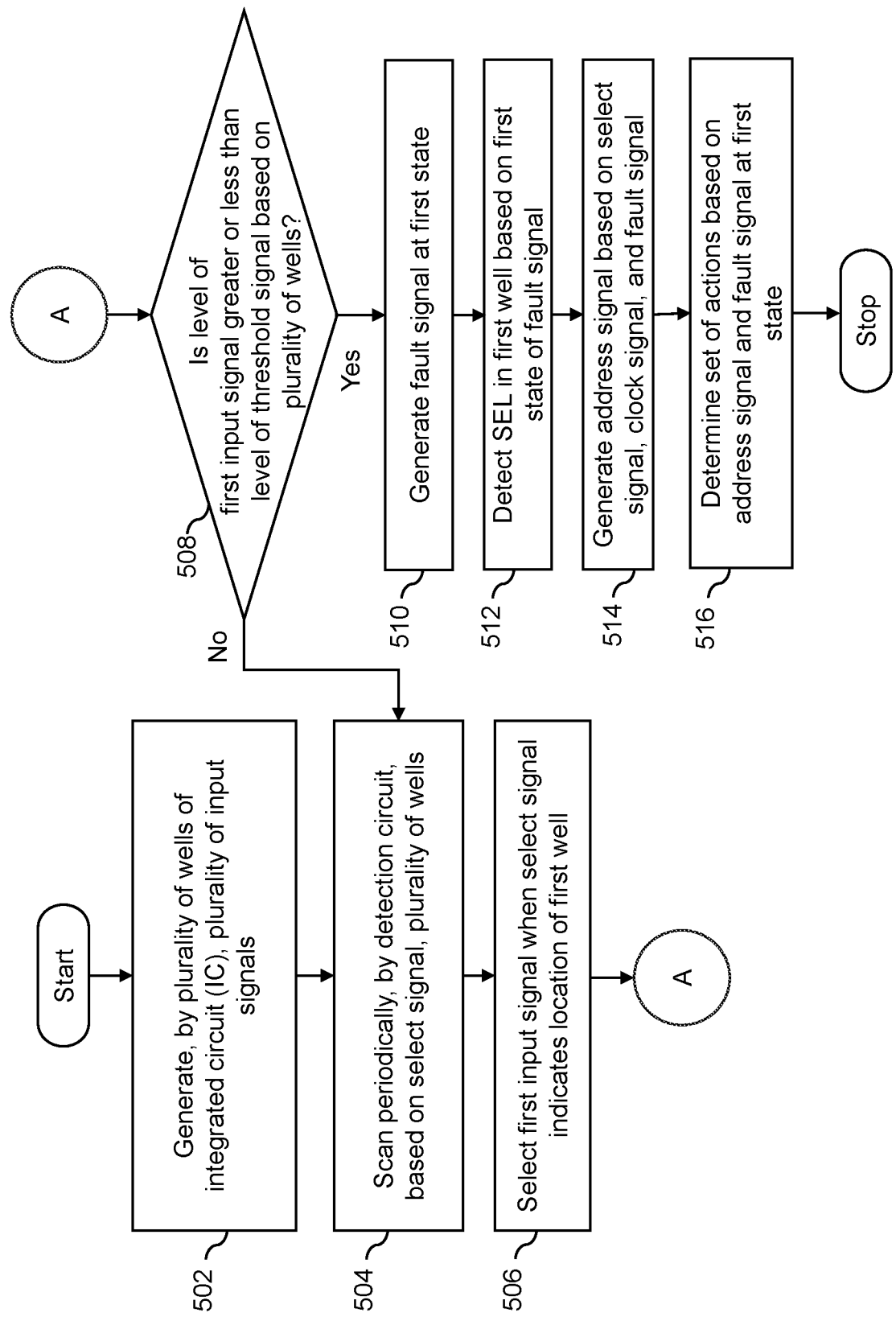

SYSTEM AND METHOD FOR IMPROVING SAFETY OF INTEGRATED CIRCUITS

CROSS-REFERENCE TO RELATED APPLICATIONS

This application claims the priority under 35 U.S.C. § 119 of India Patent application no. 202341085557, filed on 14 Dec. 2023, the contents of which are incorporated by reference herein.

FIELD OF USE

The present disclosure relates generally to electronic circuits, and, more particularly, to a system and a method for improving safety of integrated circuits.

BACKGROUND

Cosmic radiations (e.g., alpha particles, neutron particles, and the like) that are injected into a semiconductor substrate of an integrated circuit (IC) increase a substrate potential of the IC. An increase in the substrate potential may lead to forward biasing of parasitic thyristors formed between p-channel transistors and n-channel transistors of the IC thereby causing a single event latch-up (SEL) in the IC. An occurrence of SEL leads to flipping of one or more bits stored in memory cells associated with such ICs thereby compromising the security of the ICs.

BRIEF DESCRIPTION OF DRAWINGS

The following detailed description of the embodiments of the present disclosure will be better understood when read in conjunction with the appended drawings. The present disclosure is illustrated by way of example, and not limited by the accompanying figures, in which like references indicate similar elements.

FIG. 5 represents a flowchart that illustrates a latch-up detection method in the IC of FIGS. 1A, 1B, 1C, and 1D in accordance with an embodiment of the present disclosure.

DETAILED DESCRIPTION

Figure 1A:
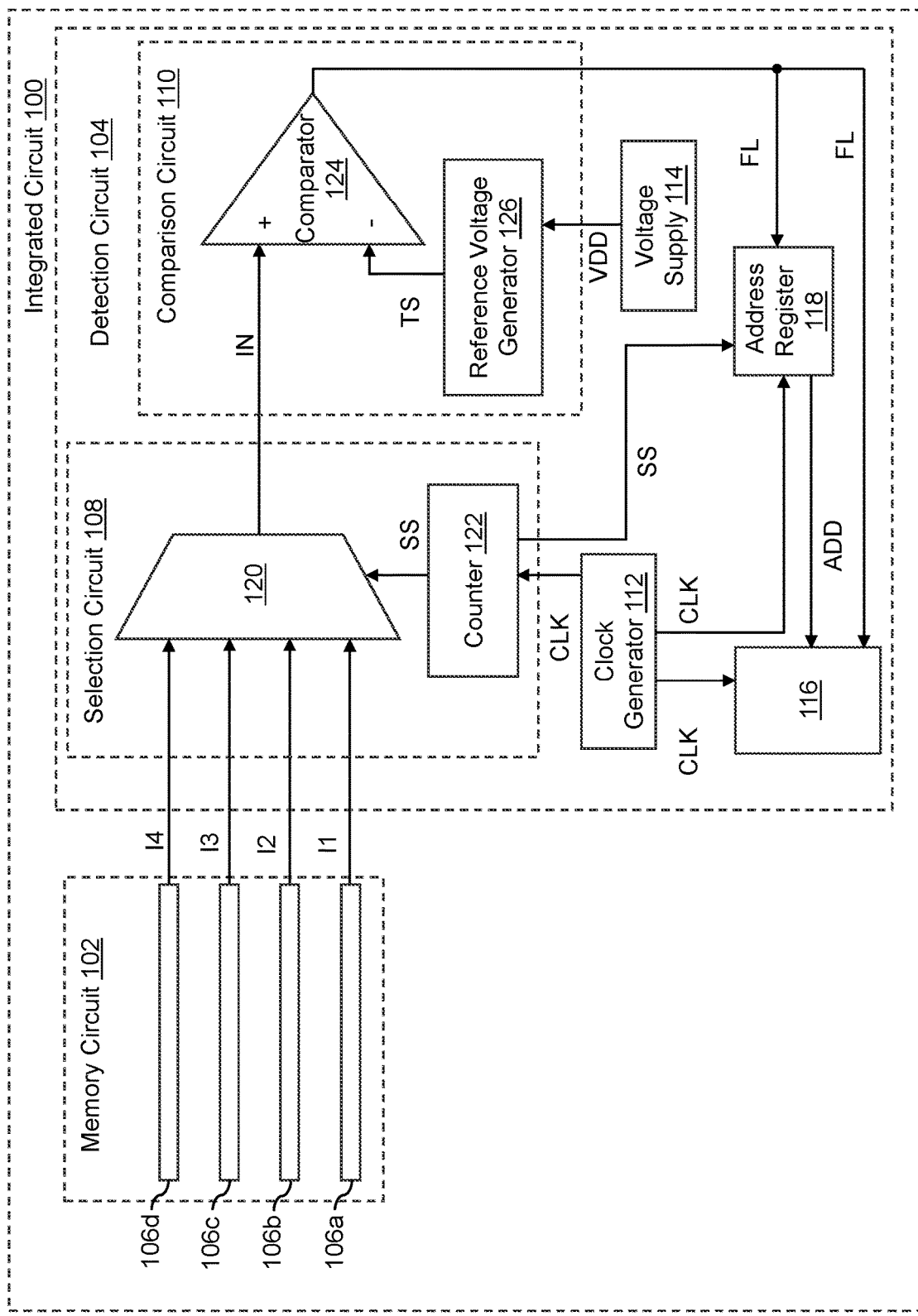
FIG. 1A illustrates a schematic block diagram of an integrated circuit (IC) in accordance with an embodiment of the present disclosure.

The detailed description of the appended drawings is intended as a description of the embodiments of the present disclosure, and is not intended to represent the only form in which the present disclosure may be practiced. It is to be understood that the same or equivalent functions may be accomplished by different embodiments that are intended to be encompassed within the spirit and scope of the present disclosure.

Overview

Conventional circuits to detect latch-ups utilize multiple signature vectors of a device (e.g., a memory device) that may be vulnerable to a latch-up such as a single event latch-up (SEL). The signature vectors may include (i) current signal characteristics and features, (ii) system state information (iii) logical state of the protected device, and/or (iv) environment information. The above-mentioned signature vectors may include one or more signature components. The detection of the multiple vector components requires several electronic components, thereby increasing the complexity of the circuit and the footprint of the device that includes such circuits. Additionally, SELs may lead to flipping of bits of the memory device. Flipping of bits may further occur due to glitches, functional bugs, or the like. Conventional circuits fail to identify a root cause of the flipping of bits. Further, the conventional circuits are incapable of detecting a location of the SEL within the device.

Various embodiments of the present disclosure disclose an Integrated Circuit (IC) to detect SEL and determine corrective actions based on the detection of the SEL. The IC may include a plurality of wells of a memory circuit. The plurality of wells may be n-wells, p-wells, or a combination of n-wells and p-wells, and a detection circuit. The detection circuit may include a selection circuit, a comparison circuit, an address register, and a fault collection and control management circuit. The selection circuit may include a scanning multiplexer and a counter. The counter based on a first clock signal may periodically provide a select signal that may be indicative of a location of a well of the plurality of wells to the scanning multiplexer and the address register. The scanning multiplexer may periodically scan the plurality of wells to select an input signal from a plurality of input signals generated by the plurality of wells. The input signal is selected based on the select signal and provided to the comparator. The comparator may compare the input signal with a threshold signal associated with the SEL to generate a fault signal. The comparator may provide the fault signal to the address register and the fault collection and control management circuit. When the fault signal is indicative of the occurrence of the SEL, the address register may provide the location of the SEL to the fault collection and control management circuit. Upon receiving the fault signal indicating the occurrence of the SEL and the location of the SEL (e.g., the corresponding well), the fault collection and control management circuit may determine one or more actions to protect the IC. The SEL in the well may be indicative of a fault in the memory circuit. The one or more actions may include resetting the IC, switching off the IC, and disabling a system clock signal provided to the IC.

The IC of the present disclosure is able to detect the location of the SEL in the plurality of wells and generate the fault signal indicating the occurrence of SEL. The detection of the SEL is performed by sensing a voltage or current in the wells and comparing the sensed voltage or current with the threshold signal to determine the occurrence of SEL. Thus, the usage of multiple signature vector components to detect latch-ups is eliminated thereby reducing the usage of electronic components on the IC and in turn reducing an area and power overhead of the IC compared to conventional circuits.

The detection circuit identifies the location of the SEL thereby enabling the fault collection and control management circuit to determine one or more actions associated with the location of the SEL in the IC. In an example, the fault collection and control management circuit may flag data originating from the location of the SEL and other locations of the IC that are in the vicinity of the location of the SEL as the flipping of bits may occur in such locations due to the vicinity. In another example, the fault collection and control management circuit may switch off or reset an area of the IC that is associated with the location of SEL to protect the IC from malfunctioning and thereby improving security and robustness of the IC. Further, the threshold signal is set to a voltage level at which SEL occurs or to a current level to enable SEL detection. When a level of the input signal exceeds or remains below a level of the threshold signal based on the type of well, the fault signal is generated to indicate that SEL has occurred. Thus, the IC is able to accurately detect a root cause of the flipping of bits that may be due to SEL. Further, since the IC is capable of detecting the SEL, the IC may be utilized to avoid security hacks by the use of laser on at least one of critical memory circuits, flip-flops, Intellectual Property (IP) in secured IP-crypto cores, hardware security engines, and Advanced Encryption Standard (AES). In addition, timely detection of the SEL may reduce a defect rate and improve the safety of the IC. Further, the detection circuit may be placed at different locations in the IC to sense a voltage difference due to the SEL and simultaneously detect the location of the SEL.

FIG. 1A illustrates a schematic block diagram of an IC 100 in accordance with an embodiment of the present disclosure. The IC 100 may be implemented in various spacecraft devices, Cryptographic Accelerator and Assurance Module (CAAM), automotive devices, network devices, mobile devices, or the like. The IC 100 may include a memory circuit 102 and a detection circuit 104. The IC 100 may be manufactured using one of Silicon, Germanium, and Gallium Arsenide.

Memory Circuit 102:

The memory circuit 102 may include suitable circuitry configured to perform one or more operations. For example, the memory circuit 102 may be configured to store data bits. The memory circuit 102 may include a plurality of wells 106a-106d. The plurality of wells 106a-106d may include a first well 106a, a second well 106b, a third well 106c, and a fourth well 106d. A set of n-channel transistors or a set of p-channel transistors may be formed in the plurality of wells 106a-106d. The set of n-channel transistors and the set of p-channel transistors may form a memory cell (not shown) of the memory circuit 102 and the memory cell may configured to store one or more data bits. Parasitic thyristors (not shown) may be formed across p-n junctions of the p-channel and n-channel transistors and corresponding wells.

When the IC 100 is exposed to cosmic radiations such as an alpha radiation or is injected with neutron particles or may be exposed to a laser, a forward biasing of the parasitic thyristors may occur thereby leading to an increase or decrease in a voltage level in at least one of the plurality of wells 106a-106d. Such a phenomenon leads to a single-event latch-up (SEL). The SEL may be indicative of a fault in the IC 100. The plurality of wells 106a-106d may be configured to generate a plurality of input signals I1-I4, respectively. In an event of the SEL, a voltage or current level associated with at least one of the plurality of input signals I1-I4 may exceed or remain below a voltage or a current level associated with a threshold signal TS. In an embodiment, when the plurality of wells 106a-106d are p-wells, the voltage or the current level of the at least one of the plurality of input signals I1-I4 is above a voltage level or a current level of the threshold signal TS upon an occurrence of the SEL. The plurality of input signals I1-I4 may correspond to at least one of a plurality of voltage signals or a plurality of current signals that are generated by the plurality of wells 106a-106d.

The memory circuit 102 may be coupled to the detection circuit 104 that may be configured to detect the occurrence of the SEL in at least one of the plurality of wells 106a-106d. The SEL in at least one of the plurality of wells 106a-106d may be indicative of a fault in the memory circuit 102. Examples of the memory circuit 102 may include but are not limited to a Static Random Access Memory (SRAM), gate arrays, and standard cell structures. For the sake of brevity of the ongoing disclosure, it has been assumed that the plurality of wells 106a-106d are included in the memory circuit 102. However, it will be understood by a person skilled in the art that the plurality of wells 106a-106d may be included in circuits (not shown) other than the memory circuit 102 and the occurrence of the SEL in such circuits is undesirable.

Detection Circuit 104:

The detection circuit 104 may include suitable circuitry configured to perform one or more operations. For example, the detection circuit 104 may be further configured to periodically scan the plurality of wells 106a-106d based on a select signal SS. The select signal SS may be indicative of a location of one of the plurality of wells 106a-106d. The detection circuit 104 may be further configured to select an input signal (e.g., the first input signal I1) when the select signal SS indicates a location of one of the plurality of wells 106a-106d (e.g., the first well 106a) and compare the first input signal I1 with the threshold signal TS to generate a fault signal FL. The voltage level or the current level of the threshold signal TS may be set above or below a voltage level or a current level that indicates occurrence of the SEL. The detection circuit 104 may be further configured to detect the SEL in the first well 106a based on a first state (e.g., asserted) of the fault signal FL and determine one or more corrective actions based on the detection of the SEL.

The detection circuit 104 may include a selection circuit 108 and a comparison circuit 110. The detection circuit 104 may further include a clock generator 112, a voltage supply 114, a fault collection and control management circuit 116, and an address register 118.

Selection Circuit 108:

The selection circuit 108 may include a scanning multiplexer 120 and a counter 122. The selection circuit 108 may be configured to periodically scan the plurality of wells 106a-106d based on the select signal SS. The select signal SS is indicative of the location of one of the plurality of wells 106a-106d at a given time instance. The selection circuit 108 may be further configured to select an input signal IN from the plurality of input signals I1-I4 based on the location of one of the plurality of wells 106a-106d that is indicated by the select signal SS. The scanning multiplexer 120 may be further configured to provide the input signal IN to the comparison circuit 110. In an example, the select signal SS indicates a first location of the first well 106a and therefore the selection circuit 108 selects the first input signal I1 and provides the first input signal I1 as the input signal IN to the comparison circuit 110.

Scanning Multiplexer 120:

The scanning multiplexer 120 may include a plurality of input terminals (e.g., first through fourth input terminals) coupled to the plurality of wells 106a-106d such that each input terminal may be coupled to a corresponding well of the plurality of wells 106a-106d. In an example, the first input terminal of the scanning multiplexer 120 may be coupled to the first well 106a. Similarly, the second through fourth input terminals may be coupled to the second through fourth wells 106b-106d, respectively. Each input terminal may be coupled to the corresponding well by way of one or more tap connections (shown later in FIGS. 4A and 4B). The scanning multiplexer 120 may further include a select terminal and an output terminal. The select terminal of the scanning multiplexer 120 may be coupled to the counter 122 and the output terminal of the scanning multiplexer 120 may be coupled to the comparison circuit 110. The scanning multiplexer 120 may be configured to receive the plurality of input signals I1-I4 and select the input signal IN from the plurality of input signals I1-I4 based on the select signal SS. The scanning multiplexer 120 may be further configured to provide the input signal IN that is selected, to the comparison circuit 110. In an example, the select signal SS indicates the first location and therefore the selection circuit 108 selects the first input signal I1 and provides the first input signal I1 to the comparison circuit 110.

Counter 122:

The counter 122 may be configured to periodically generate the select signal SS based on a clock signal CLK. With each clock pulse of the clock signal CLK, the select signal SS may be updated to indicate a location of a corresponding well. The select signal SS may include a set of address bits to indicate a location of the well. The number of address bits may be based on a count of wells. In an embodiment, the plurality of wells 106a-106d include four wells. Thus, each well location may be indicated by two address bits in the select signal SS. In an example, a location of the first well 106a (e.g., the first location) may be indicated by address bits "00" in the select signal SS whereas a location of the second well 106b may be indicated by address bits "01" in the select signal SS. In another example, the count of wells in the memory circuit 102 is eight, therefore the select signal SS may include three address bits to represent a corresponding location of the eight wells. It will be understood by a person skilled in the art that 'N' address bits are included in the select signal SS to represent locations of $2^N$ wells in the memory circuit 102.

In an embodiment, the select signal SS may indicate the first location at a first clock pulse of the clock signal CLK. Thereafter, each well location of the plurality of wells 106a-106d is indicated by the select signal SS at each clock pulse of the clock signal CLK. Subsequent to the select signal SS indicating the location of the fourth well 106d at a fourth clock pulse of the clock signal CLK, the counter 122 may reset to begin generating the select signal SS indicative of the first location. The locations of the remaining second through fourth wells 106b-106d are thus continued thereafter thereby resulting in periodic scanning of the plurality of wells 106a-106d by the scanning multiplexer 120. The counter 122 may be further configured to provide the select signal SS to the address register 118 at each pulse of the clock signal CLK.

Comparison Circuit 110:

The comparison circuit 110 may be coupled to the selection circuit 108. The comparison circuit 110 may include suitable circuitry configured to perform one or more operations. For example, the comparison circuit 110 may be configured to receive the input signal IN from the selection circuit 108 (e.g., by way of the output terminal of the scanning multiplexer 120). The comparison circuit 110 may be further configured to compare the input signal IN with the threshold signal TS to generate a fault signal FL. The fault signal FL may be generated at the first state (e.g., asserted) or a second state (e.g., de-asserted) based on the comparison. The fault signal FL generated at the first state indicates the occurrence of the SEL in a well associated with the input signal IN. The fault signal FL generated at the second state indicates absence of SEL in the well associated with the input signal IN. The comparison circuit 110 may include a comparator 124 and a reference voltage generator 126.

Comparator 124:

The comparator 124 may include (i) a non-inverting terminal (+) coupled to the output terminal of the scanning multiplexer 120 and configured to receive the input signal IN from the scanning multiplexer 120 and (ii) an inverting terminal (−) coupled to the reference voltage generator 126 and configured to receive the threshold signal TS from the reference voltage generator 126. The comparator 124 may be further configured to generate the fault signal FL at an output terminal of the comparator 124 based on a comparison of the input signal IN with the threshold signal TS. In an embodiment, when the plurality of wells 106a-106d are p-wells, the comparator 124 may generate the fault signal FL at the first state when the voltage or the current level of the input signal IN exceeds the voltage or the current level of the threshold signal TS. The comparator 124 may generate the fault signal FL at the second state when the voltage or the current level of the input signal IN is below the voltage or the current level of the threshold signal TS. Further, the output terminal of the comparator 124 may be coupled to the address register 118 and the fault collection and control management circuit 116. The comparator 124 may be configured to provide the fault signal FL to the address register 118 and the fault collection and control management circuit 116.

Reference Voltage Generator 126:

The reference voltage generator 126 may be coupled to the voltage supply 114. The reference voltage generator 126 may be configured to generate the threshold signal TS based on a supply voltage VDD milli-Volts (mV) received from the voltage supply 114. The reference voltage generator 126 may be further configured to provide the threshold signal TS that may be indicative of the SEL, to the inverting terminal of the comparator 124. In an embodiment, when the plurality of wells 106a-106d are p-wells, the voltage level of the threshold signal TS is in a range of 250 mV-300 mV. Thus, when the voltage level of the input signal IN provided to the comparator 124 exceeds the voltage level of the threshold signal TS, the fault signal FL may be generated at the first state. Further, when the voltage level of the input signal IN is below the voltage level of the threshold signal TS, the fault signal FL may be generated at the second state.

Clock Generator 112:

The clock generator 112 may be coupled to the counter 122, the address register 118, and the fault collection and control management circuit 116. The clock generator 112 may be configured to generate the clock signal CLK and provide the clock signal CLK to the counter 122, the address register 118, and the fault collection and control management circuit 116. In an embodiment, a frequency of the clock signal CLK is approximately 10 Mega-Hertz (MHz).

Address Register 118:

The address register 118 may be coupled to the counter 122, the comparison circuit 110 (e.g., the output terminal of the comparator 124), and the fault collection and control management circuit 116. The address register 118 may be configured to receive the clock signal CLK and the select signal SS from the counter 122 as and when the select signal SS is generated by the counter 122. Upon receipt of the select signal SS, the address register 118 may overwrite a previous location indicated by the select signal SS at a previous clock pulse, that is stored in the counter 122. In an example, at the first clock pulse of the clock signal CLK, a first location "00" (e.g., the location of the first well 106a) is stored in the address register 118 whereas at a second clock pulse of the clock signal CLK, a second location "01" (e.g., the location of the second well 106b) is stored in the address register 118. The address register 118 may be further configured to receive the fault signal FL, and generate an address signal ADD when the fault signal FL is at the first state. The address signal ADD is indicative of the location of the well that is associated with the select signal SS based on the first state of the fault signal FL. In an example, when the select signal SS is indicative of the first well 106a and the fault signal FL is at the first state, the address signal ADD is indicative of the first location of the first well 106a. The address register 118 may be configured to provide the address signal ADD to the fault collection and control management circuit 116. When the fault signal FL is at the second state, the address register 118 may be further configured to disable the generation of the address signal ADD.

Fault Collection and Control Management Circuit 116:

The fault collection and control management circuit 116 may be coupled to the clock generator 112, the comparison circuit 110 (e.g., the output terminal of the comparator 124), and the address register 118. The fault collection and control management circuit 116 may include suitable circuitry configured to perform one or more operations. For example, the fault collection and control management circuit 116 may be configured to receive the fault signal FL from the comparator 124, the address signal ADD from the address register 118, and the clock signal CLK from the clock generator 112. The address signal ADD may be indicative of the location of one of the plurality of wells 106a-106d when the fault signal FL is at the first state. The fault collection and control management circuit 116 may be further configured to detect, based on the first state of the fault signal FL, the SEL in one of the plurality of wells 106a-106d. The fault collection and control management circuit 116 may be further configured to determine a set of actions based on the receipt of the address signal ADD and the fault signal FL at the first state. In an example, at the first clock pulse of the clock signal CLK, the address signal ADD indicates the first location of the first well 106a and the fault signal FL is at the first state. Thus, the fault collection and control management circuit 116 detects that SEL has occurred in the first well 106a and thereupon determines the set of actions. The set of actions is directed to ensuring safety of the IC 100 from damages due to the SEL. The set of actions may include at least one of resetting the IC 100, switching-off the IC 100, and disabling a system clock signal (not shown) provided to the IC 100.

In Operation:

The plurality of wells 106a-106d may be a plurality of p-wells that are configured to generate the plurality of input signals I1-I4 and provide the plurality of input signals I1-I4 to the scanning multiplexer 120. Thus, the plurality of p-wells may include a first p-well that corresponds to the first well 106a, a second p-well that corresponds to the second well 106b, a third p-well that corresponds to the third well 106c, and a fourth p-well that corresponds to the fourth well 106d. The scanning multiplexer 120 may be configured to receive the select signal SS from the counter 122 and periodically scan the plurality of wells 106a-106d and select the input signal IN of the plurality of input signals I1-I4 based on the select signal SS. For example, at start of a first scan cycle, the select signal SS may indicate the first location of the first well 106a. The first scan cycle is indicative of a total number of clock pulses to execute the scanning of each well of the plurality of wells 106a-106d. The scanning multiplexer 120 may thus select the first input signal I1 generated by the first well 106a. Subsequently, as described above, the select signal SS is updated periodically based on the clock signal CLK to indicate locations of the remaining wells (e.g., the second through fourth wells 106b-106d). Consequently, the scanning multiplexer 120 may select each of the second through fourth input signals I2-I4. Thus, the scanning multiplexer 120 scans each of the plurality of wells 106a-106d in the first scan cycle. Subsequent to completion of the first scan cycle, the counter 122 may be reset and a second scan cycle is initiated. The scanning of the plurality of wells 106a-106d in the second scan cycle is similar to the scanning in the first scan cycle. In a scenario, when the SEL is detected, the fault collection and control management circuit 116 may determine a corrective action causing the IC 100 to be either switched-OFF or reset. Thus, it will be understood by a person skilled in the art that the periodic scanning of the plurality of wells 106a-106d may be discontinued in such a scenario, and the scanning of the plurality of wells 106a-106d may resume after the IC 100 is switched ON. It may be further understood by a person skilled in the art that a time duration of a scan cycle (e.g., the first scan cycle and the second scan cycle) of the periodic scanning is based on the frequency of the clock signal CLK and the count of wells in the memory circuit 102. In an embodiment, the first scan cycle of the clock signal CLK includes four clock pulses as the plurality of wells 106a-106d include four wells.

The scanning multiplexer 120 may be configured to provide the first input signal I1 (selected based on the select signal SS indicating the first location) to the non-inverting terminal of the comparator 124. The comparator 124 may be configured to compare the first input signal I1 with the threshold signal TS to determine whether the voltage level or the current level of the first input signal I1 exceeds the voltage level or the current level of the threshold signal TS. In an embodiment, the plurality of wells 106a-106d are p-wells that operate at ground potential (e.g., 0 Volts) in absence of SEL. Upon the occurrence of the SEL, the voltage level of the plurality of wells 106a-106d may increase to a value in the range of 250 mV-300 mV. Thus, to detect the occurrence of SEL in the plurality of wells 106a-106d, the threshold signal TS generated by the reference voltage generator 126 may have the voltage level in the range of 250 mV-300 mV.

The comparator 124 may be configured to generate the fault signal FL at the first state when the voltage or the current level of the first input signal I1 exceeds the voltage or the current level of the threshold signal TS thereby indicating the occurrence of SEL in the first well 106a. The comparator 124 may be configured to provide the fault signal FL to the address register 118 and the fault collection and control management circuit 116. The address register 118 may be configured to generate the address signal ADD and provide the address signal ADD to the fault collection and control management circuit 116. The address signal ADD is indicative of the first location of the first well 106a to indicate the occurrence of the SEL in the first well 106a. Upon receipt of the address signal ADD, the fault collection and control management circuit 116 may determine the set of actions to ensure safety of the IC 100.

Figure 1B:
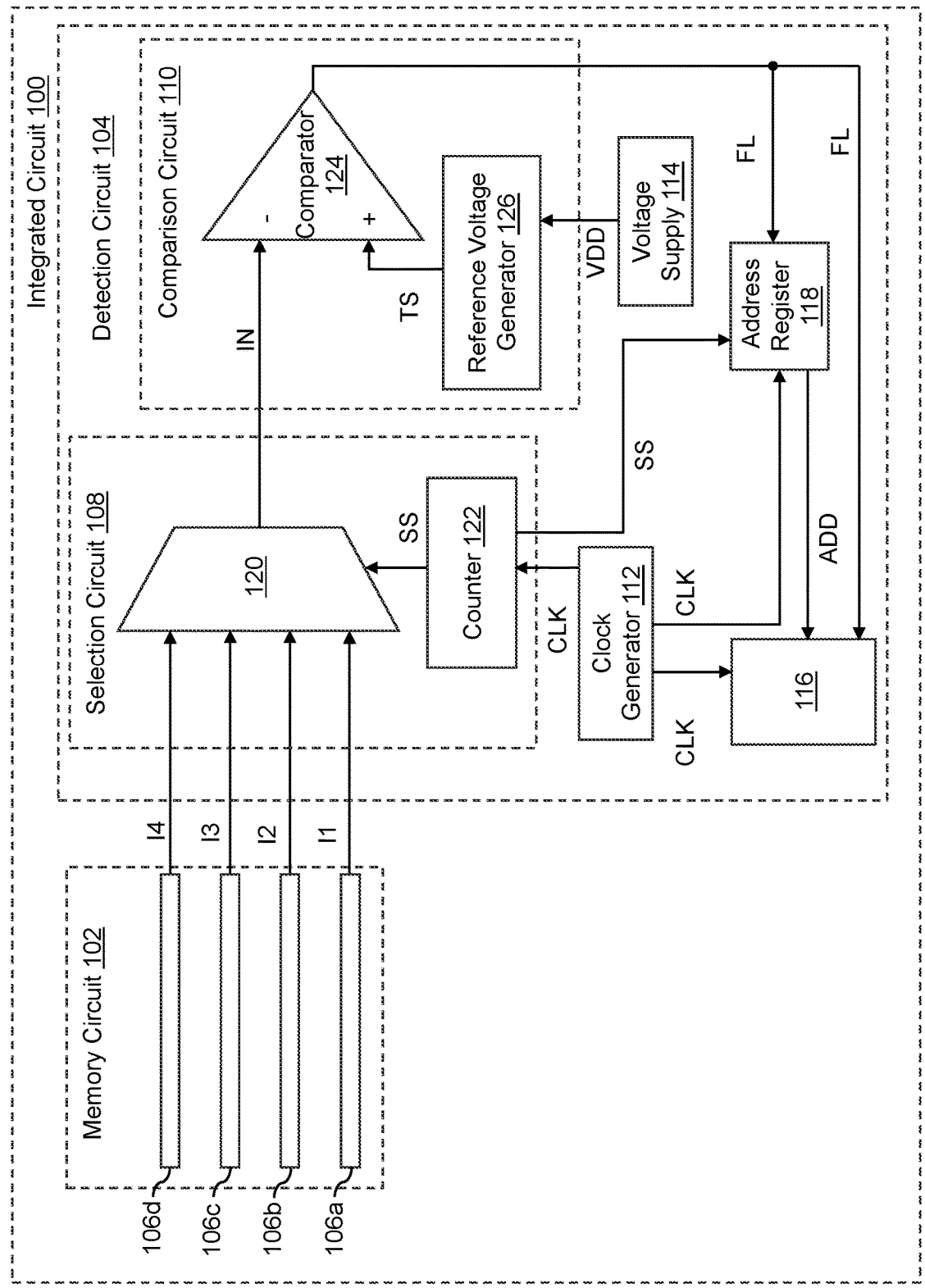
FIG. 1B illustrates a schematic block diagram of the IC of FIG. 1A in accordance with another embodiment of the present disclosure.

FIG. 1B illustrates a schematic block diagram of the IC 100 of FIG. 1A in accordance with another embodiment of the present disclosure. The plurality of wells 106a-106d of the IC 100 of FIG. 1B may be a plurality of n-wells. Thus, the plurality of n-wells may include a first n-well that corresponds to the first well 106a, a second n-well that corresponds to the second well 106b, a third n-well that corresponds to the third well 106c, and a fourth n-well that corresponds to the fourth well 106d.

Comparator 124:

The inverting terminal (−) of the comparator 124 may be coupled to the output terminal of the scanning multiplexer 120 and the non-inverting terminal (+) of the comparator 124 may be coupled to the reference voltage generator 126. The comparator 124 may be configured to receive the input signal IN of the plurality of input signals I1-I4 from the scanning multiplexer 120 and the threshold signal TS from the reference voltage generator 126. When the plurality of wells 106a-106d are n-wells, the voltage level of the at least one of the plurality of input signals I1-I4 is below the voltage level of the threshold signal TS or the current level of the at least one of the plurality of input signals I1-I4 is above the current level of the threshold signal TS upon the occurrence of the SEL. The functionalities of remaining components of FIG. 1B are similar to the corresponding components described in FIG. 1A.

In Operation:

The comparator 124 may be configured to receive the first input signal I1 as the input signal IN from the scanning multiplexer 120. The comparator 124 may be further configured to generate the fault signal FL at the first state when the voltage level of the first input signal I1 is below the voltage level of the threshold signal TS or the current level of the first input signal I1 is above the current level of the threshold signal TS indicating the occurrence of SEL in the first well 106a. Further, the comparator 124 may be further configured to generate the fault signal FL at the second state when the voltage level of the first input signal I1 is above the voltage level of the threshold signal TS or the current level of the first input signal I1 is below the current level of the threshold signal TS indicating the absence of SEL in the first well 106a. In an embodiment, the plurality of wells 106a-106d are n-wells that have a normal operating voltage equivalent to the supply voltage VDD mV. Upon the occurrence of SEL, the operating voltage of the plurality of wells 106a-106d is reduced by more than 300 mV from the normal operating voltage. Thus, to detect the occurrence of SEL in the plurality of wells 106a-106d, the threshold signal TS is equivalent to 300 mV or more below the supply voltage VDD mV (e.g., VDD mV-300 mV). The comparator 124 may be further configured to provide the fault signal FL to the address register 118 and the fault collection and control management circuit 116. The address register 118 may be configured to generate the address signal ADD and provide the address signal ADD to the fault collection and control management circuit 116 when the fault signal FL is at the first state. The address signal ADD is indicative of the first location. Upon receipt of the address signal ADD, the fault collection and control management circuit 116 may determine the set of actions to protect the IC 100.

Figure 1C:
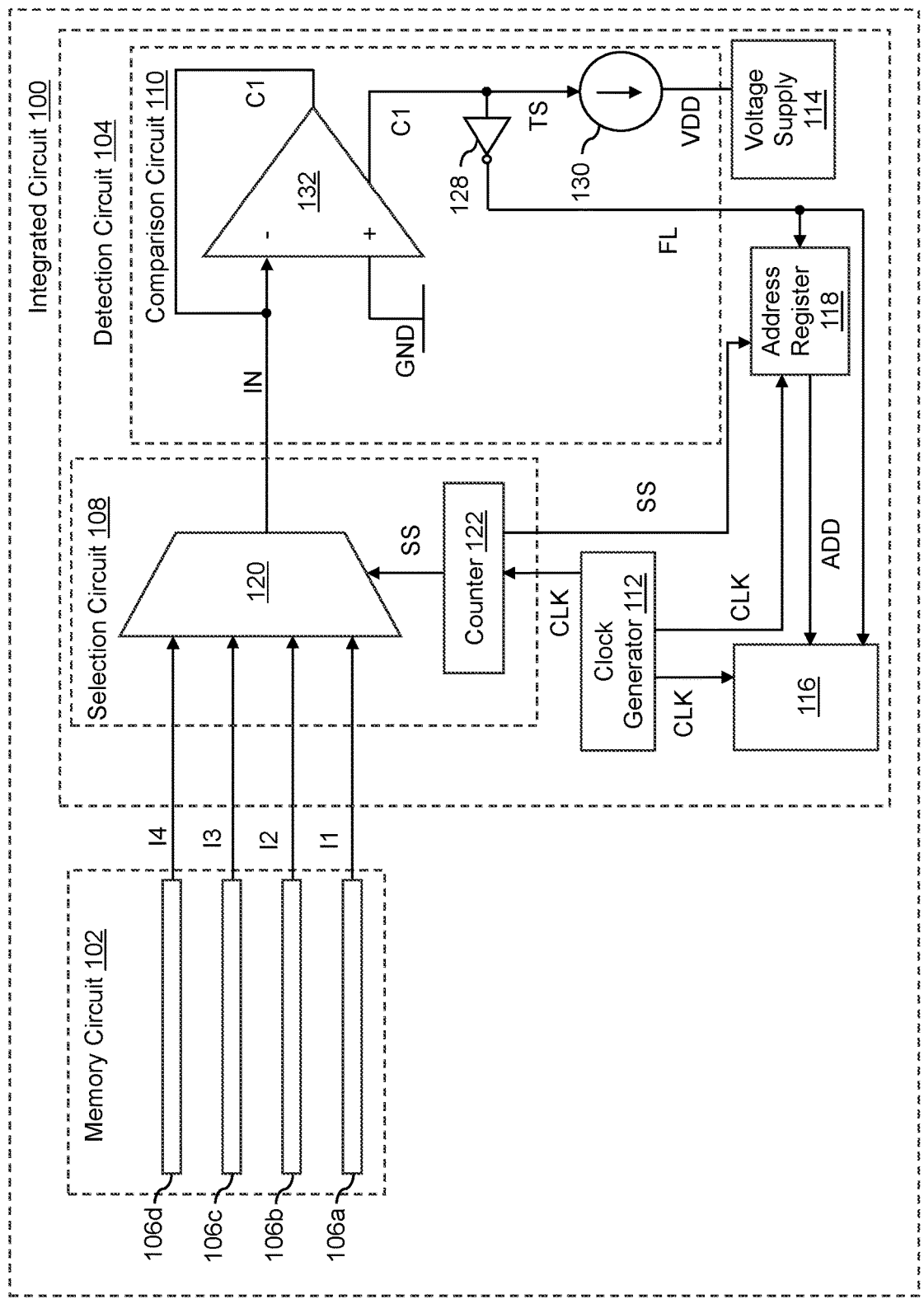
FIG. 1C illustrates a schematic block diagram of the IC of FIG. 1A in accordance with yet another embodiment of the present disclosure.

FIG. 1C illustrates a schematic block diagram of the IC 100 of FIG. 1A in accordance with yet another embodiment of the present disclosure. In addition to the components depicted in FIG. 1A, FIG. 1C includes an inverter 128, a reference current generator 130, and an operational amplifier 132 in place of the comparator 124.

Operational Amplifier 132:

The operational amplifier 132 may include (i) an inverting terminal (−) and (ii) a non-inverting terminal (+). The operational amplifier 132 may be connected in a negative feedback loop configuration such that the inverting terminal of the operational amplifier 132 may be coupled to a first output terminal of the operational amplifier 132 and the non-inverting terminal of the operational amplifier 132 may be coupled to a ground terminal GND. The operational amplifier 132 may include a second output terminal that may be configured to replicate an output generated at the first output terminal of the operational amplifier 132.

Inverter 128:

An input terminal of the inverter 128 may be coupled to the second output terminal of the operational amplifier 132, and an output terminal of the inverter 128 may be coupled to the address register 118 and the fault collection and control management circuit 116. The inverter 128 may be configured to invert an output signal generated at the second output terminal of the operational amplifier 132. Although not shown, the inverter 128 receives supply voltages at supply terminals thereof for performing the corresponding inversion operation.

Reference Current Generator 130:

The reference current generator 130 may have a first end and a second end. The first end of the reference current generator 130 may be coupled to the second output terminal of the operational amplifier 132 and the input terminal of the inverter 128, and the second end of the reference current generator 130 may be coupled to the voltage supply 114. The reference current generator 130 may be configured to receive the supply voltage VDD mV from the voltage supply 114 and generate the threshold signal TS that is indicative of the SEL. In an embodiment, the plurality of wells 106a-106d are p-wells that operate at ground potential (e.g., 0 Volts) in absence of SEL and therefore have zero current level. Upon the occurrence of SEL, the current level of the plurality of wells 106a-106d may increase. Thus, to detect the occurrence of SEL in the plurality of wells 106a-106d, a current level of the threshold signal TS generated by the reference current generator 130 is in the range 10 micro-Amperes (µA)-50 µA.

In Operation:

The operational amplifier 132 may be connected in the negative feedback loop configuration. The operational amplifier 132 may be configured to equate a voltage level at the inverting terminal of the operational amplifier 132 to a voltage level at the non-inverting terminal of the operational amplifier 132 that is coupled to the ground terminal GND.

Thus, the voltage level at the non-inverting terminal of the operational amplifier 132 is at 0 volts. The operational amplifier 132 may be configured to generate a first current signal C1 at the first output terminal of the operational amplifier 132 such that the first current signal C1 reduces the voltage level at the inverting terminal of the operational amplifier 132 to 0 volts. The second output terminal of the operational amplifier 132 may be configured to replicate the first current signal C1 generated at the first output terminal of the operational amplifier 132.

In absence of SEL, the current level of the threshold signal TS may exceed a current level of the first current signal C1 such that a voltage level at the input terminal of the inverter 128 may remain equivalent to the supply voltage VDD mV (e.g., asserted). In an embodiment, in the absence of SEL, the current level of the first current signal C1 is approximately equivalent to 0 μA. Therefore, the inverter 128 may be configured to generate the fault signal FL at the second state (e.g., de-asserted) indicating the absence of SEL. In an example, a threshold voltage level for an analog signal to be logically asserted may be 5 mV, therefore, when the voltage level at the input terminal of the inverter 128 is above 5 mV, the voltage level at the input terminal of the inverter 128 remains asserted.

When the voltage level at the inverting terminal of the operational amplifier 132 increases (e.g., exceeds 300 mV) due to the occurrence of the SEL, the current level of the first current signal C1 may exceed the current level of the threshold signal TS. Thus, the voltage level at the input terminal of the inverter 128 may become equivalent to 0 volts (e.g., de-asserted). Therefore, the inverter 128 may be configured to generate the fault signal FL that is at the first state (e.g., asserted) indicating the SEL. The inverter 128 may be configured to provide the fault signal FL to the address register 118 and the fault collection and control management circuit 116. In an example, when the voltage level at the input terminal of the inverter 128 is below 5 mV, the voltage level at the input terminal of the inverter 128 remains de-asserted.

The functionalities of remaining components of FIG. 1C are similar to the corresponding components described in FIG. 1A.

Figure 1D:
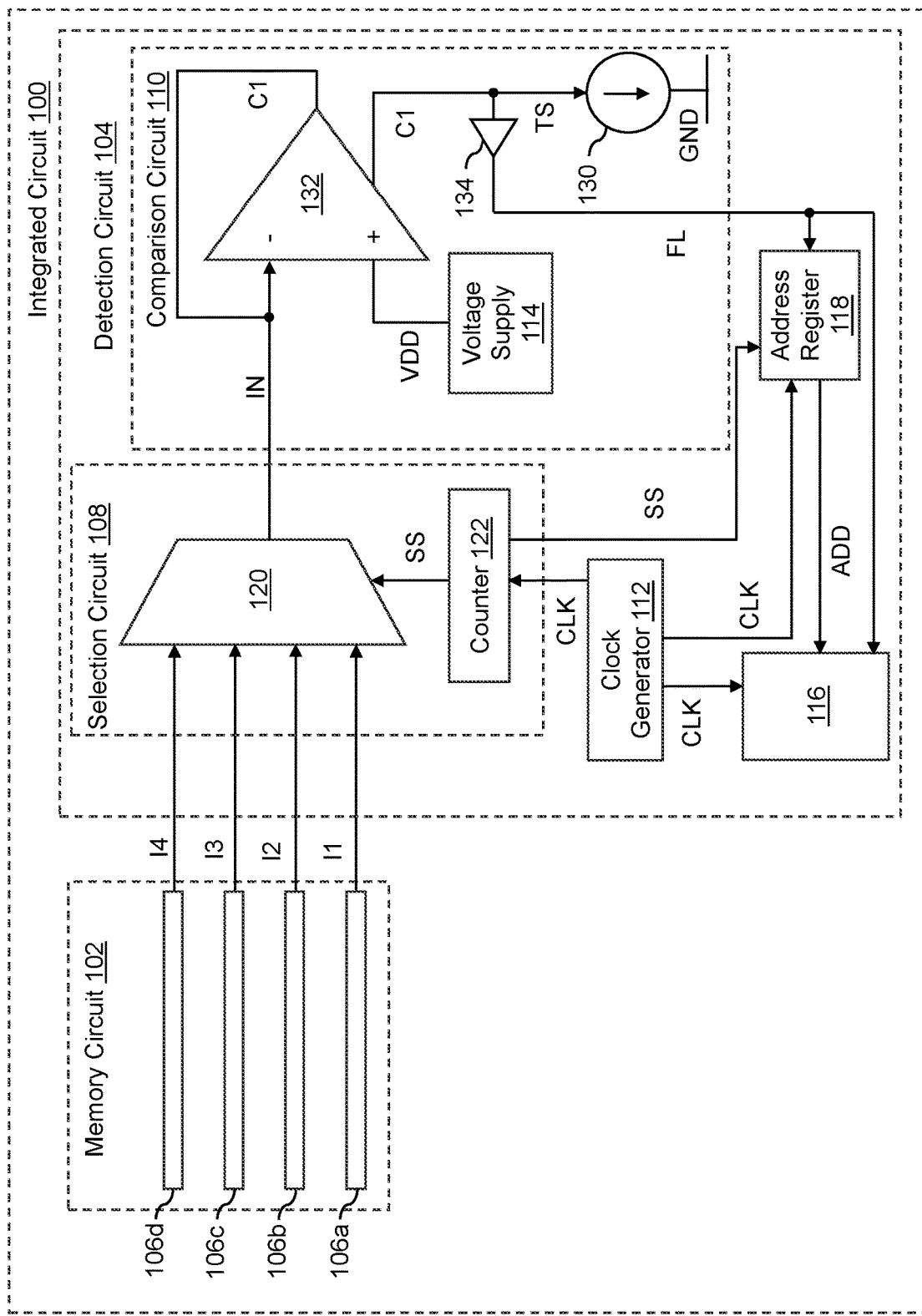
FIG. 1D illustrates a schematic block diagram of the IC of FIG. 1A in accordance with yet another embodiment of the present disclosure.

FIG. 1D illustrates a schematic block diagram of the IC 100 of FIG. 1A in accordance with yet another embodiment of the present disclosure. In addition to the components depicted in FIG. 1C, the IC 100 of FIG. 1D includes a buffer 134 in place of the inverter 128.

Operational Amplifier 132:

The operational amplifier 132 may be connected in the negative feedback loop configuration such that the inverting terminal (−) of the operational amplifier 132 may be coupled to the first output terminal of the operational amplifier 132 and the non-inverting terminal (+) of the operational amplifier 132 may be coupled to the voltage supply 114 and configured to receive the supply voltage VDD mV. The second output terminal of the operational amplifier 132 may be configured to replicate the output generated at the first output terminal of the operational amplifier 132.

Buffer 134:

An input terminal of the buffer 134 may be coupled to the second output terminal of the operational amplifier 132 and an output terminal of the buffer 134 may be coupled to the address register 118 and the fault collection and control management circuit 116. The buffer 134 may be configured to receive an input, such as the first current signal C1, and generate an asserted output signal, such as the fault signal FL, when the input has a non-zero value.

Reference Current Generator 130:

The first end of the reference current generator 130 may be coupled to the second output terminal of the operational amplifier 132 and the second end of the reference current generator 130 may be coupled to the ground terminal GND. The reference current generator 130 may be configured to generate the threshold signal TS that is indicative of the SEL. In an embodiment, the plurality of wells 106a-106d are n-wells that have the normal operating voltage equivalent to the supply voltage VDD mV and have normal current level approximately equivalent to 0 μA. Upon the occurrence of SEL, the current level of the plurality of wells 106a-106d may increase to a value in the range of 10 μA-50 μA. Thus, to detect the occurrence of SEL in the plurality of wells 106a-106d, a current level of the threshold signal TS generated by the reference current generator 130 is in the range of 10 μA-50 μA.

In Operation:

The operational amplifier 132 may be connected in the negative loop configuration. The operational amplifier 132 may be configured to generate the first current signal C1 to maintain the voltage level at the inverting terminal of the operational amplifier 132 equivalent to the supply voltage VDD mV (e.g., same as the voltage at the non-inverting terminal of the operational amplifier 132). Thus, when the voltage level at the inverting terminal of the operational amplifier 132 reduces due to a voltage level of the first input signal I1 provided by the scanning multiplexer 120, the first current signal C1 increases the voltage level at the inverting terminal to the supply voltage VDD mV. The second output terminal of the operational amplifier 132 may be configured to replicate the output at the first output terminal (e.g., the first current signal C1) and generate the first current signal C1. In absence of the SEL, the first current signal C1 may remain approximately equivalent to 0 μA and hence a voltage level at the input terminal of the buffer 134 may remain equivalent to the ground terminal GND. Therefore, the buffer 134 may generate the fault signal FL that is at the second state indicating absence of the SEL.

When the voltage level at the inverting terminal of the operational amplifier 132 decreases due to the occurrence of the SEL, the current level of the first current signal C1 may exceed the current level of the threshold signal TS generated by the reference current generator 130. This may cause the voltage level at the input terminal of the buffer 134 to increase to the supply voltage VDD mV. Therefore, the buffer 134 may generate the fault signal FL at the first state indicating the occurrence of the SEL. The buffer 134 may be configured to provide the fault signal FL to the address register 118 and the fault collection and control management circuit 116. In an example, when the voltage level at the input terminal of the buffer 134 is above 5 mV, the voltage level at the input terminal of the buffer 134 remains asserted.

The functionalities of remaining components of FIG. 1D are similar to the corresponding components described in FIG. 1C.

In various embodiments, the count of wells in the memory circuit 102 is depicted as four. However, it will be understood by a person skilled in the art that the count of wells may be more or less than 4. Similarly, the scanning multiplexer 120 is depicted to be a 4×1 multiplexer (e.g., having four input terminals based on the count of wells), however, it will be understood by a person skilled in the art that the scanning multiplexer 120 may have greater or less than four input terminals based on the count of wells.

Although FIGS. 1A, 1B, 1C, and 1D illustrate that all of the circuits are implemented on the IC 100, in other embodiments, some of the circuitry may be located external to the IC 100. For example, in some embodiments, the voltage supply 114 may be external to the IC 100. In some other embodiments, the clock generator 112 may be external to the IC 100.

Although FIGS. 1A, 1B, 1C, and 1D illustrate usage of the detection circuit 104 in conjunction with the memory circuit 102, it will be understood by a person skilled in the art that detection circuit 104 may be used to detect the SEL in other electronic circuits formed using different configurations of the p-channel and n-channel transistors. Further, it will be understood by a person skilled in the art that the plurality of wells 106a-106d may be located in various circuits of the IC 100 or within a single circuit of the IC 100.

Figure 2A:
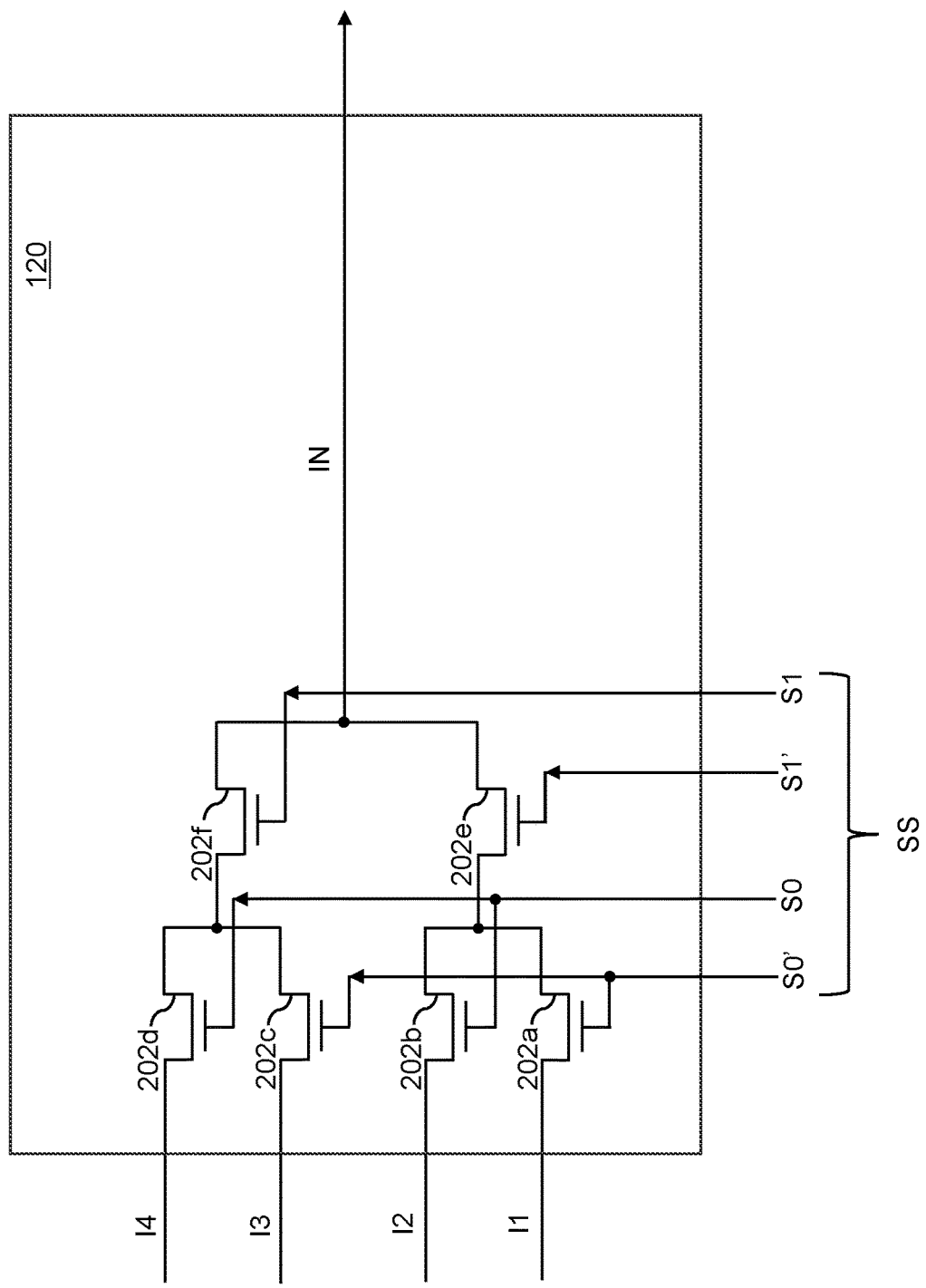
FIG. 2A illustrates a schematic block diagram of a scanning multiplexer of the IC of FIGS. 1A and 1C in accordance with an embodiment of the present disclosure.

FIG. 2A illustrates a schematic block diagram of the scanning multiplexer 120 of the IC 100 of FIGS. 1A and 1C in accordance with an embodiment of the present disclosure. The scanning multiplexer 120 may include a plurality of n-channel transistors 202a-202f. In an embodiment, the plurality of n-channel transistors 202a-202f may include a first n-channel transistor 202a, a second n-channel transistor 202b, a third n-channel transistor 202c, a fourth n-channel transistor 202d, a fifth n-channel transistor 202e, and a sixth n-channel transistor 202f.

Each of the plurality of n-channel transistors 202a-202f may include a first terminal, a second terminal, and a gate terminal. The first and second terminals of the plurality of n-channel transistors 202a-202f may be one of source or drain terminals. The first terminals of the first through fourth n-channel transistor 202a-202d may be coupled to the plurality of wells 106a-106d, and configured to receive the plurality of input signals I1-I4 that may be generated by the plurality of wells 106a-106d, respectively. In an embodiment, the plurality of wells 106a-106d are p-wells.

The first terminal of the first n-channel transistor 202a may be coupled to the first well 106a and may be configured to receive the first input signal IT. The gate terminal of the first n-channel transistor 202a may be coupled to the counter 122 and may be configured to receive an inverted version of a first address bit S0 (e.g., S0') of a set of address bits associated with the select signal SS. Further, the first terminal of the second n-channel transistor 202b may be coupled to the second well 106b and may be configured to receive the second input signal I2 of the plurality of input signals I1-I4. The gate terminal of the second n-channel transistor 202b may be coupled to the counter 122 and configured to receive the first address bit S0. The first terminal of the third n-channel transistor 202c may be coupled to the third well 106c and configured to receive the third input signal I3 of the plurality of input signals I1-I4. The gate terminal of the third n-channel transistor 202c may be coupled to the counter 122 and configured to receive the inverted version of the first address bit S0 (e.g., S0'). The first terminal of the fourth n-channel transistor 202d may be coupled to the fourth well 106d and may be configured to receive the fourth input signal I4 of the plurality of input signals I1-I4. The gate terminal of the fourth n-channel transistor 202d may be coupled to the counter 122 and configured to receive the first address bit S0.

The first terminal of the fifth n-channel transistor 202e may be coupled to the second terminal of the first n-channel transistor 202a and the second terminal of the second n-channel transistor 202b. The gate terminal of the fifth n-channel transistor 202e may be coupled to the counter 122 and configured to receive an inverted version of a second address bit S1 (e.g., S1') of the set of address bits associated with the select signal SS. The first terminal of the sixth n-channel transistor 202f may be coupled to the second terminal of the third n-channel transistor 202c and the second terminal of the fourth n-channel transistor 202d. The gate terminal of the sixth n-channel transistor 202f may be coupled to the counter 122 and configured to receive the second address bit S1. The second terminal of the sixth n-channel transistor 202f may be coupled to the second terminal of the fifth n-channel transistor 202e to output at least one of a group consisting of the first input signal I1, the second input signal I2, the third input signal I3, and the fourth input signal I4, as the input signal IN.

In Operation:

The address bits S0 and S1 of the select signal SS provided to the plurality of n-channel transistors 202a-202f may control a conductive state of the plurality of n-channel transistors 202a-202f. When an address bit provided to the gate terminal of each of the plurality of n-channel transistors 202a-202f is asserted, the plurality of n-channel transistors 202a-202f may switch ON. In an example, when the first address bit S0 is '0' and the second address bit S1 is '0', the inverted first address bit S0' is '1' and the inverted second address bit S1' is '1'. Thus, the first n-channel transistor 202a and the third n-channel transistor 202c are switched ON.

When the address bit provided to the gate terminal of each of the plurality of n-channel transistors 202a-202f is de-asserted, the plurality of n-channel transistors 202a-202f may switch OFF. Thus, the second n-channel transistor 202b and the fourth n-channel transistor 202d are switched OFF due to the first address bit S0 being '0'. Furthermore, the fifth n-channel transistor 202e is switched ON and the sixth n-channel transistor 202f is switched OFF due to the inverted second address bit S1' being '1' and the second address bit S1 being '0'. Thus, the address bit combination of S0=0 and S1=0 enables selection of the first input signal I1 as the input signal IN that is provided to the comparison circuit 110. Similarly, other combinations of the address bits S0 and S1 may enable selection of the remaining second through fourth input signals I2-I4. Therefore, based on the assertion of different address bits of the select signal SS, each of the plurality of n-channel transistors 202a-202f either switch ON or switch OFF, thereby enabling the scanning multiplexer 120 to select one of the plurality of input signals I1-I4.

Figure 2B:
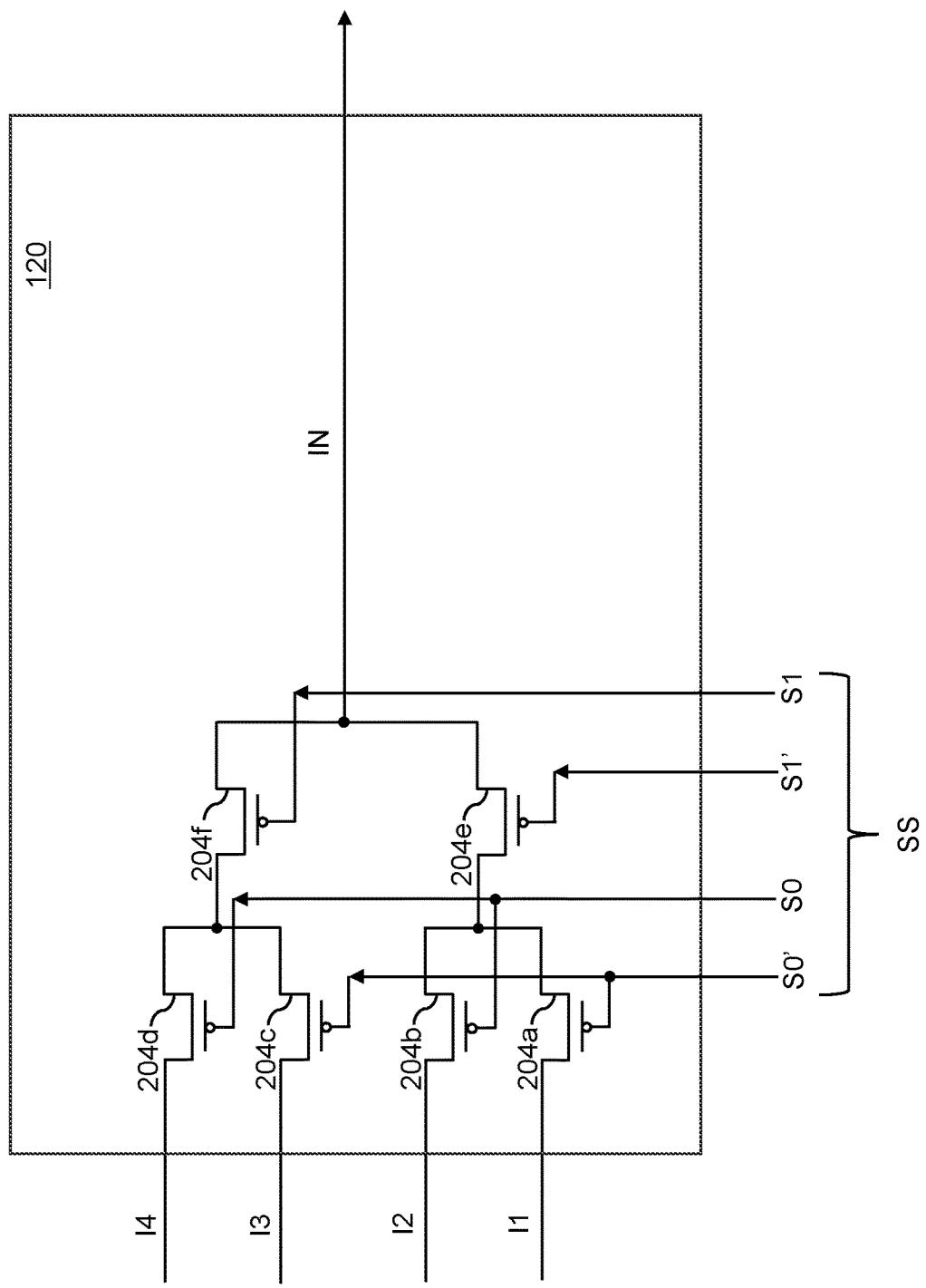
FIG. 2B illustrates a schematic block diagram of the scanning multiplexer of the IC of FIGS. 1B and 1D in accordance with another embodiment of the present disclosure.

FIG. 2B illustrates a schematic block diagram of the scanning multiplexer 120 of the IC 100 of FIGS. 1B and 1D in accordance with another embodiment of the present disclosure. The scanning multiplexer 120 includes a plurality of p-channel transistors 204a-204f. In an embodiment, the plurality of p-channel transistors 204a-204f may include a first p-channel transistor 204a, a second p-channel transistor 204b, a third p-channel transistor 204c, a fourth p-channel transistor 204d, a fifth p-channel transistor 204e, and a sixth p-channel transistor 204f.

Each of the plurality of p-channel transistors 204a-204f may include a first terminal, a second terminal, and a gate terminal. The first and second terminals of the plurality of p-channel transistors 204a-204f may be one of source or drain terminals. The first terminals of the first through fourth p-channel transistors 204a-204d may be coupled to the plurality of wells 106a-106d, and configured to receive the plurality of input signals I1-I4 that may be generated by the plurality of wells 106a-106d, respectively. In an embodiment, the plurality of wells 106a-106d are n-wells.

The first terminal of the first p-channel transistor 204a may be coupled to the first well 106a and may be configured to receive the first input signal I1. The gate terminal of the first p-channel transistor 204*a* may be coupled to the counter 122 and may be configured to receive the inverted version of the first address bit S0 (e.g., S0') of the set of address bits associated with the select signal SS. Further, the first terminal of the second p-channel transistor 204*b* may be coupled to the second well 106*b* and may be configured to receive the second input signal I2 of the plurality of input signals I1-I4. The gate terminal of the second p-channel transistor 204*b* may be coupled to the counter 122 and configured to receive the first address bit S0. The first terminal of the third p-channel transistor 204*c* may be coupled to the third well 106*c* and configured to receive the third input signal I3 of the plurality of input signals I1-I4. The gate terminal of the third p-channel transistor 204*c* may be coupled to the counter 122 and configured to receive the inverted version of the first address bit S0 (e.g., S0'). The first terminal of the fourth p-channel transistor 204*d* may be coupled to the fourth well 106*d* and may be configured to receive the fourth input signal I4 of the plurality of input signals I1-I4. The gate terminal of the fourth p-channel transistor 204*d* may be coupled to the counter 122 and configured to receive the first address bit S0.

The first terminal of the fifth p-channel transistor 204*e* may be coupled to the second terminal of the first p-channel transistor 204*a* and the second terminal of the second p-channel transistor 204*b*. The gate terminal of the fifth p-channel transistor 204*e* may be coupled to the counter 122 and configured to receive the inverted version of the second address bit S1 (e.g., S1') of the set of address bits associated with the select signal SS. The first terminal of the sixth p-channel transistor 204*f* may be coupled to the second terminal of the third p-channel transistor 204*c* and the second terminal of the fourth p-channel transistor 204*d*. The gate terminal of the sixth p-channel transistor 204*f* may be coupled to the counter 122 and configured to receive the second address bit S1. The second terminal of the sixth p-channel transistor 204*f* may be coupled to the second terminal of the fifth p-channel transistor 204*e* to output at least one of the group consisting of the first input signal I1, the second input signal I2, the third input signal I3, and the fourth input signal I4 as the input signal IN.

In Operation:

The address bits S0 and S1 of the select signal SS provided to the plurality of p-channel transistors 204*a*-204*f* may control a conductive state of the plurality of p-channel transistors 204*a*-204*f*. When an address bit provided to the gate terminal of each of the plurality of p-channel transistors 204*a*-204*f* is asserted, the plurality of p-channel transistors 204*a*-204*f* may switch OFF. In an example, the first address bit S0 is '0', the second address bit S1 is '0', the inverted first address bit S0' is '1', and the inverted second address bit S1' is '1'. Thus, the first p-channel transistor 204*a* and the third p-channel transistor 204*c* are switched OFF.

When the address bit provided to the gate terminal of each of the plurality of p-channel transistors 204*a*-204*f* is de-asserted, the plurality of p-channel transistors 204*a*-204*f* may switch ON. Thus, the second n-channel transistor 202*b* and the fourth n-channel transistor 202*d* are switched ON due to the first address bit S0 being '0'. Furthermore, the fifth p-channel transistor 204*e* is switched OFF and the sixth p-channel transistor 204*f* is switched ON due to the inverted second address bit S1 being '1' and the second address bit S1 being '0'. Thus, the address bit combination of S0=0 and S1=0 enables selection of the fourth input signal I4 as the input signal IN. Similarly, other combinations of the address bits S0 and S1 may enable selection of the remaining first through third input signals I1-I3. Therefore, based on the assertion of different address bits of the select signal SS, various p-channel transistors of the plurality of p-channel transistors 204*a*-204*f* either switch ON or switch OFF, thereby enabling the scanning multiplexer 120 to select one of the input signals I1-I4.

Figure 3C:
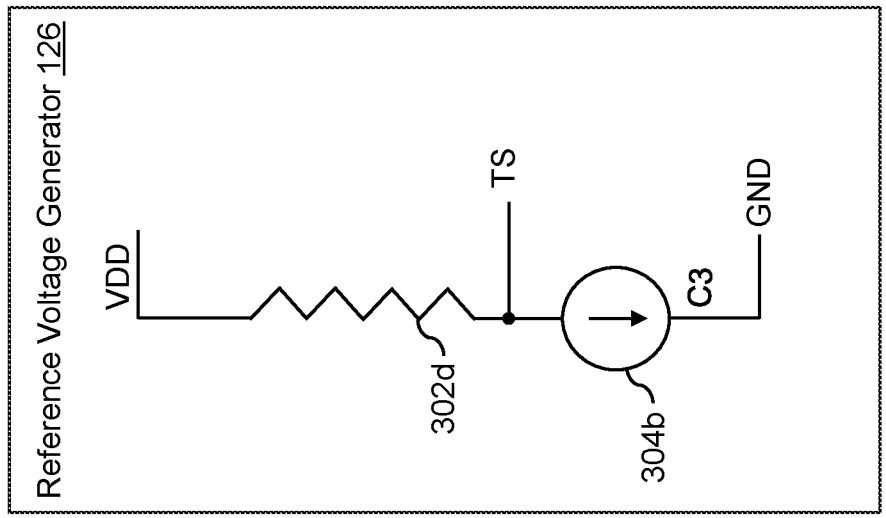
FIG. 3C illustrates a schematic block diagram of the reference voltage generator of the IC of FIG. 1B in accordance with another embodiment of the present disclosure.
Figure 3B:
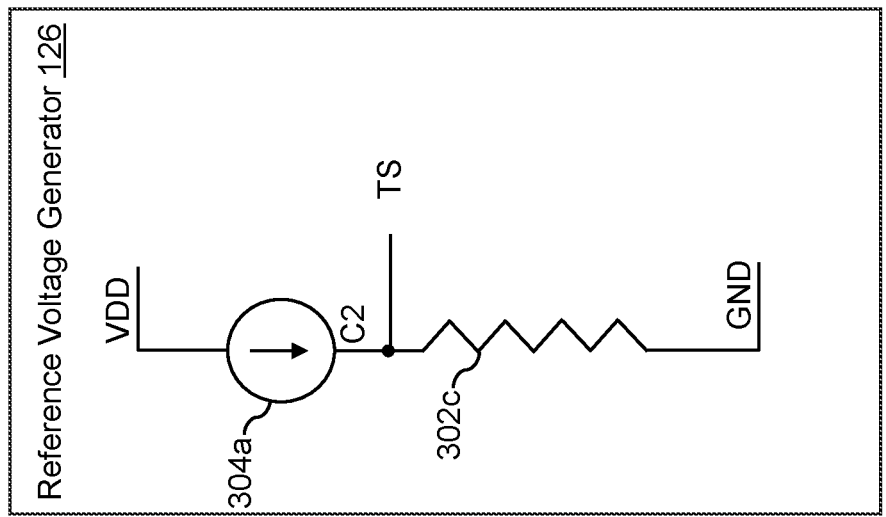
FIG. 3B illustrates a schematic block diagram of the reference voltage generator of the IC of FIG. TA in accordance with another embodiment of the present disclosure.
Figure 3A:
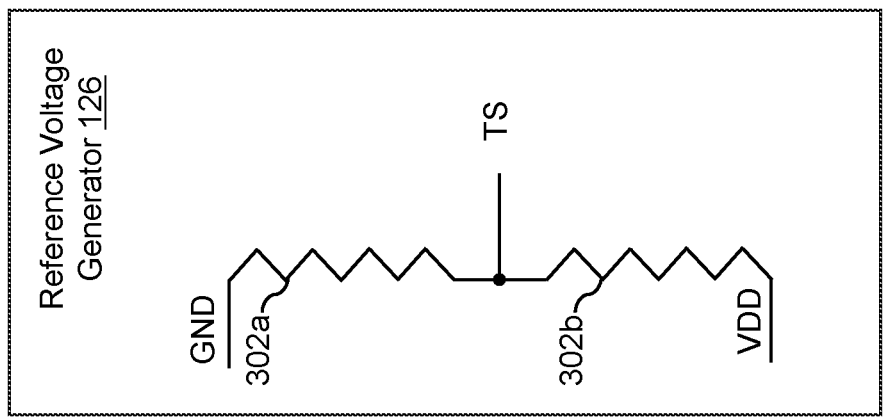
FIG. 3A illustrates a schematic block diagram of a reference voltage generator of the IC of FIGS. 1A and 1B in accordance with an embodiment of the present disclosure.

FIG. 3A illustrates a schematic block diagram of the reference voltage generator 126 of the IC 100 of FIGS. 1A and 1B in accordance with an embodiment of the present disclosure. The reference voltage generator 126 may include a first resistor 302*a* and a second resistor 302*b*. Each of the first resistor 302*a* and the second resistor 302*b* may have a first terminal and a second terminal.

The first terminal of the first resistor 302*a* may be coupled to the ground terminal GND. The first terminal of the second resistor 302*b* may be coupled to the second terminal of the first resistor 302*a* and the second terminal of the second resistor 302*b* may be configured to receive the supply voltage VDD mV. The threshold signal TS may be generated at a junction of the second terminal of the first resistor 302*a* and the first terminal of the second resistor 302*b*. The threshold signal TS may have different voltage levels based on the occurrence of SEL in a p-well or an n-well of the plurality of wells 106*a*-106*d*. In an embodiment, when the plurality of wells 106*a*-106*d* are p-wells, the voltage level of the threshold signal TS is in the range 250 mV-300 mV. In another embodiment, when the plurality of wells 106*a*-106*d* are n-wells, the voltage level of the threshold signal TS is 300 mV below the supply voltage VDD mV (e.g., VDD mV-300 mV). The values of the first resistor 302*a* and the second resistor 302*b* are selected such that a desired voltage level of the threshold signal TS may be achieved.

FIG. 3B illustrates a schematic block diagram of the reference voltage generator 126 of the IC 100 of FIG. 1A in accordance with another embodiment of the present disclosure. The reference voltage generator 126 may include a third resistor 302*c* and a first current generator 304*a*. The third resistor 302*c* may have a first terminal and a second terminal. Further, the first current generator 304*a* may have a first end and a second end.

The first end of the first current generator 304*a* may be configured to receive the supply voltage VDD mV and generate a second current signal C2. The first terminal of the third resistor 302*c* may be coupled to the second end of the first current generator 304*a* and the second terminal of the third resistor 302*c* may be coupled to the ground terminal GND. The threshold signal TS may be generated at a junction of the first terminal of the third resistor 302*c* and the second end of the first current generator 304*a*. The threshold signal TS may have a voltage level to detect occurrence of SEL in a p-well of the plurality of wells 106*a*-106*d*. The values of the second current signal C2 and the third resistor 302*c* are selected such that a desired voltage level of the threshold signal TS may be achieved.

FIG. 3C illustrates a schematic block diagram of the reference voltage generator 126 of the IC 100 of FIG. 1B in accordance with another embodiment of the present disclosure. The reference voltage generator 126 may include a fourth resistor 302*d* and a second current generator 304*b*. The fourth resistor 302*d* may have a first terminal and a second terminal. Further, the second current generator 304*b* may have a first end and a second end.

The first end of the second current generator 304*b* may be coupled to the ground terminal GND and configured to generate a third current signal C3. The first terminal of the fourth resistor 302*d* may be coupled to the second end of the second current generator 304*b* and the second terminal of the fourth resistor 302*d* may be configured to receive the supply voltage VDD mV. The threshold signal TS may be generated at a junction of the first terminal of the fourth resistor 302d and the second end of the second current generator 304b. The threshold signal TS may have a voltage level to detect the occurrence of SEL in an n-well of the plurality of wells 106a-106d. The values of the third current signal C3 and the fourth resistor 302d are selected such that a desired voltage level of the threshold signal TS may be achieved.

Figure 4A:
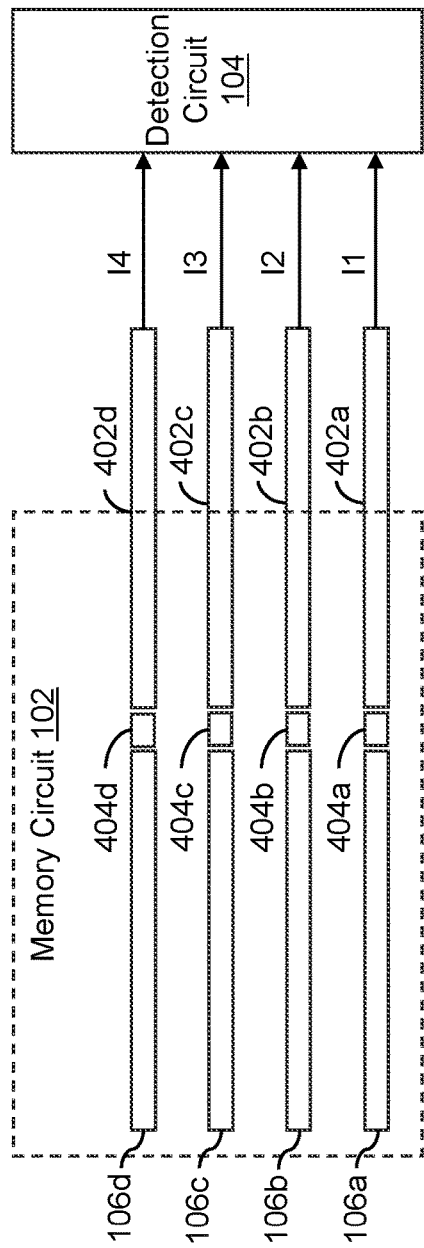
FIG. 4A illustrates a schematic block diagram of a memory circuit of the IC of FIGS. 1A, 1B, 1C, and 1D in accordance with an embodiment of the present disclosure.

FIG. 4A illustrates a schematic block diagram of the memory circuit 102 and the detection circuit 104 of the IC 100 of FIGS. 1A, 1B, 1C, and 1D in accordance with an embodiment of the present disclosure. The memory circuit 102 may further include a plurality of isolated tap connections 402a-402d and a plurality of well-ties 404a-404d. The plurality of isolated tap connections 402a-402d may include a first isolated tap connection 402a, a second isolated tap connection 402b, a third isolated tap connection 402c, and a fourth isolated tap connection 402d. The plurality of well-ties 404a-404d may include a first well-tie 404a, a second well-tie 404b, a third well-tie 404c, and a fourth well-tie 404d.

The plurality of isolated tap connections 402a-402d may be coupled to the plurality of wells 106a-106d by way of the plurality of well-ties 404a-404d. In an example, the first isolated tap connection 402a may be coupled to the first well 106a by way of the first well-tie 404a. The plurality of isolated tap connections 402a-402d serve as carriers of the plurality of input signals I1-I4 and enable transmission of the plurality of input signals I1-I4 to the detection circuit 104. Since each well of the plurality of wells 106a-106d is separately tapped by way of a corresponding isolated tap connection of the plurality of isolated tap connections 402a-402d, specific addresses are utilized to scan each well of the plurality of wells 106a-106d.

Figure 4B:
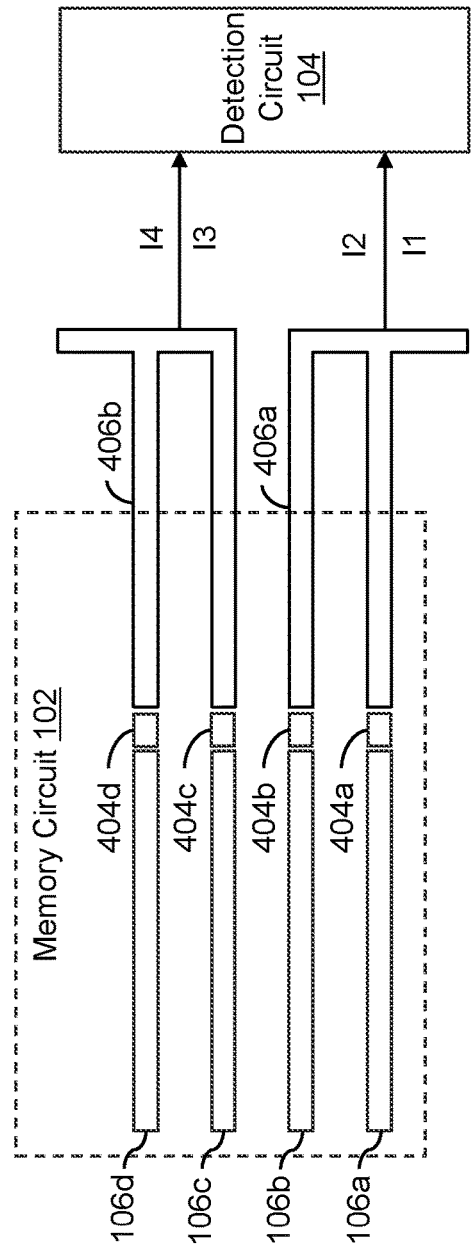
FIG. 4B illustrates a schematic block diagram of the memory circuit of the IC of FIGS. 1A, 1B, 1C, and 1D in accordance with another embodiment of the present disclosure.

FIG. 4B illustrates a schematic block diagram of the memory circuit 102 and the detection circuit 104 of FIG. 4A in accordance with another embodiment of the present disclosure. The memory circuit 102 may further include a first shared tap connection 406a and a second shared tap connection 406b in place of the plurality of isolated tap connections 402a-402d.

The first shared tap connection 406a and the second shared tap connection 406b may be coupled to the plurality of wells 106a-106d by way of the plurality of well-ties 404a-404d. In an example, the first shared tap connection 406a may be coupled to the first well 106a by way of the first well-tie 404a. The first shared tap connection 406a serves as a shared carrier of the first input signal I1 and the second input signal I2 and enables transmission of the first input signal I1 and the second input signal I2 to the detection circuit 104. The second shared tap connection 406b serves as a shared carrier of the third input signal I3 and the fourth input signal I4 and enables transmission of the third input signal I3 and the fourth input signal I4 to the detection circuit 104. Since, the first well 106a and the second well 106b share the first shared tap connection 406a, the first well 106a and the second well 106b may share an address during scanning of the first well 106a and the second well 106b. Similarly, the third well 106c and the fourth well 106d share the second shared tap connection 406b, the third well 106c and the fourth well 106d may share an address during scanning of the third well 106c and the fourth well 106d. Thus, when the select signal SS indicates an address corresponding to the first well 106a and the second well 106b, a combination of the first input signal I1 and the second input signal I2 are selected as the input signal IN. Similarly, when the select signal SS indicates an address corresponding to the first well 106a and the second well 106b, a combination of the first input signal I3 and the second input signal I4 are selected as the input signal IN.

FIG. 5 represents a flowchart that illustrates a method (e.g., a latch-up detection method) for detecting SEL in the IC 100 of FIGS. 1A, 1B, 1C, and 1D in accordance with an embodiment of the present disclosure.

At step 502, the plurality of wells 106a-106d of the memory circuit 102 may generate the plurality of input signals I1-I4. The plurality of input signals I1-I4 may be generated due to the occurrence of SEL in the plurality of wells 106a-106d, respectively. In an embodiment, the plurality of wells 106a-106d are p-wells. In another embodiment, the plurality of wells 106a-106d are n-wells. Steps 504-516 are executed by the detection circuit 104.

At step 504, the scanning multiplexer 120 may periodically scan the plurality of wells 106a-106d based on the select signal SS that may be generated by the counter 122 based on the clock signal CLK. The select signal SS may be indicative of the first location of the first well 106a of the plurality of wells 106a-106d and with each clock pulse of the clock signal CLK, the select signal SS may be updated to indicate locations of the second through fourth wells 106b-106d. In an embodiment, the select signal SS is a sequence of 2 address bits indicative of the locations of the plurality of wells 106a-106d. Subsequent to the select signal SS indicating the location of the fourth well 106d, the counter 122 may be reset to begin generating the select signal SS indicative of the first location of the first well 106a and continuing thereafter with locations of the remaining second through fourth wells 106b-106d.

At step 506, the scanning multiplexer 120 may select the first input signal I1 when the select signal SS indicates the first location of the first well 106a, and provide the first input signal I1 to the comparator 124. At step 508, the comparator 124 may compare the first input signal I1 with the threshold signal TS to determine whether a level of the first input signal I1 exceeds a level of the threshold signal TS (e.g., when the plurality of wells 106a-106d are p-wells) or whether the level of the first input signal I1 remains below the level of the threshold signal TS (e.g., when the plurality of wells 106a-106d are n-wells). The threshold signal TS is indicative of the SEL. When the plurality of wells 106a-106d are p-wells and if it is determined that the level of the first input signal I1 exceeds the level of the threshold signal TS, step 510 is performed. When the plurality of wells 106a-106d are p-wells and if it is determined that the level of the first input signal I1 remains below the level of the threshold signal TS, step 504 is repeated. Additionally, the fault signal FL may be generated at the second state. When the plurality of wells 106a-106d are n-wells and if it is determined that the level of the first input signal I1 remains below the level of the threshold signal TS, step 510 is performed. When the plurality of wells 106a-106d are n-wells and if it is determined that the level of the first input signal I1 is above the level of the threshold signal TS, step 504 is repeated. In another embodiment, the fault signal FL may be generated at the second state.

At step 510, the comparator 124 may generate the fault signal FL at the first state to indicate the occurrence of SEL. The fault signal FL at the first state may be provided to the address register 118 and the fault collection and control management circuit 116. At step 512, the address register 118 may detect the occurrence of SEL in the first well 106a based on receipt of the asserted fault signal FL (e.g., on receiving the fault signal FL at the first state). The occurrence of SEL in the first well 106a may be indicative of a fault in the memory circuit 102. At step 514, the address register 118 may generate the address signal ADD based on the select signal SS, the clock signal CLK, and the asserted fault signal FL. The address ADD is indicative of the first location where the occurrence of SEL is detected. The address signal ADD may be provided to the fault collection and control management circuit 116. At step 516, the fault collection and control management circuit 116 may determine the set of actions based on the receipt of the address signal ADD and the fault signal FL at the first state indicating the SEL in the first well 106a. The set of actions are intended to protect the IC 100 from any damage or attack due to the SEL which may lead to malfunction of the device in which the IC 100 is implemented.

Thus, in the present disclosure, the detection circuit 104 is able to detect the occurrence of SEL in the memory circuit 102 and generate the fault signal FL at the first state indicating the occurrence of SEL (e.g., the fault in the memory circuit 102). The detection of the SEL is performed by sensing the voltage or current associated with the plurality of input signals I1-I4 that are generated by the plurality of wells 106a-106d of the memory circuit 102. The sensed voltage or current is compared with the level of the threshold signal TS to determine the occurrence of SEL. Thus, SEL is detected based on sensing of a voltage or a current as compared to multiple signature vector components utilized by the conventional circuits, thereby reducing the usage of electronic components on the IC 100 and in turn reducing an area and power overhead of the IC 100 as compared to conventional circuits.

The detection circuit 104 identifies the location of the SEL in the memory circuit 102 thereby enabling the fault collection and control management circuit 116 to determine one or more actions associated with the location of the SEL in the memory circuit 102. In an example, the fault collection and control management circuit 116 may flag data originating from the location of the SEL and other locations of the IC 100 that are in the vicinity of the location of the SEL as the flipping of bits may occur in such locations due to the vicinity. In another example, the fault collection and control management circuit 116 may switch off or reset an area of the memory circuit 102 that is associated with the location of SEL to protect the IC 100 from malfunctioning and thereby improving security and robustness of the IC. Further, the threshold signal TS is set to the current or voltage level at which SEL occurs. When the level of the input signal IN exceeds or remains below the level of the threshold signal TS based on the type of the plurality of wells 106a-106d being p-wells or n-wells, the fault signal FL is generated at the first state to indicate that the SEL has occurred. Thus, the IC 100 is able to accurately detect the root cause of the flipping of bits that may be due to the SEL. Further, since the IC 100 is capable of detecting the SEL, the IC 100 may be utilized to avoid security hacks by the use of laser on at least one of critical memory circuits, flip-flops, Intellectual Property (IP) in secured IP-crypto cores, and hardware security engine. In addition, timely detection of the SEL may reduce a defect rate of the memory circuit 102 and improve the safety of the IC 100. Further, the detection circuit 104 may be placed at different locations in the IC 100 to sense a voltage difference due to the SEL and simultaneously detect the location of the SEL.

In an embodiment, an integrated circuit (IC) may comprise a plurality of wells of a memory circuit configured to generate a plurality of input signals, wherein a first well of the plurality of wells may be configured to generate a first input signal of the plurality of input signals. The IC may further comprise a detection circuit that may be coupled to the plurality of wells, wherein the detection circuit may be configured to periodically scan, based on a select signal, the plurality of wells. The select signal may be indicative of a location of each well of the plurality of wells. The detection circuit may be further configured to select the first input signal when the select signal indicates a first location of the first well, and compare, the first input signal with a threshold signal to generate a fault signal, wherein the threshold signal is indicative of a Single Event Latch-up (SEL). The detection circuit may be further configured to detect, based on a first state of the fault signal, the SEL in the first well indicative of a fault in the memory circuit.

In some embodiments, the detection circuit may comprise a selection circuit, wherein the selection circuit may comprise a counter that may be configured to receive a clock signal and generate the select signal based on the clock signal. The periodic scanning may be based on a frequency of the clock signal and a count of wells in the plurality of wells. A scanning multiplexer of the detection circuit may be coupled to the counter and the plurality of wells, wherein the scanning multiplexer may be configured to, periodically scan, based on the select signal, the plurality of wells, and select the first input signal when the select signal indicates the first location.

In some embodiments, the select signal may comprise a set of address bits, wherein when the set of address bits may be indicative of the first location, the first input signal may be selected.

In some embodiments, the plurality of wells may comprise a plurality of p-wells, wherein the plurality of p-wells may comprise a first p-well, a second p-well, a third p-well, and a fourth p-well. The first p-well corresponds to the first well. The scanning multiplexer may comprise a plurality of n-channel transistors that may be coupled to the plurality of p-wells, wherein the plurality of n-channel transistors comprise a first n-channel transistor, a second n-channel transistor, a third n-channel transistor, a fourth n-channel transistor, a fifth n-channel transistor, and a sixth n-channel transistor. Each of the plurality of n-channel transistors comprises a first terminal, a gate terminal, and a second terminal. The first terminal of the first n-channel transistor may be coupled to the first p-well and configured to receive the first input signal, and the gate terminal of the first n-channel transistor may be coupled to the counter and configured to receive an inverted version of a first address bit of the set of address bits. The first terminal of the second n-channel transistor may be coupled to the second p-well and configured to receive a second input signal of the plurality of input signals, and the gate terminal of the second n-channel transistor may be coupled to the counter and configured to receive the first address bit of the set of address bits. The first terminal of the third n-channel transistor may be coupled to the third p-well and configured to receive a third input signal of the plurality of input signals, and the gate terminal of the third n-channel transistor may be coupled to the counter and configured to receive the inverted version of the first address bit. The first terminal of the fourth n-channel transistor may be coupled to the fourth p-well and configured to receive a fourth input signal of the plurality of input signals, and the gate terminal of the fourth n-channel transistor may be coupled to the counter and configured to receive the first address bit. The first terminal of the fifth n-channel transistor may be coupled to the second terminal of the first n-channel transistor and the second terminal of the second n-channel transistor, and the gate terminal of the fifth n-channel transistor may be coupled to the counter and configured to receive an inverted version of a second address bit of the set of address bits. The first terminal of the sixth n-channel transistor may be coupled to the second terminal of the third n-channel transistor and the second terminal of the fourth n-channel transistor, the gate terminal of the sixth n-channel transistor may be coupled to the counter and configured to receive the second address bit, and the second terminal of the sixth n-channel transistor may be coupled to the second terminal of the fifth n-channel transistor to output at least one of a group consisting of the first input signal, the second input signal, the third input signal, and the fourth input signal.

In some embodiments, the plurality of wells comprise a plurality of n-wells, wherein the plurality of n-wells may comprise a first n-well, a second n-well, a third n-well, and a fourth n-well, wherein the first n-well corresponds to the first well, wherein the scanning multiplexer may comprise a plurality of p-channel transistors coupled to the plurality of n-wells. The plurality of p-channel transistors comprise a first p-channel transistor, a second p-channel transistor, a third p-channel transistor, a fourth p-channel transistor, a fifth p-channel transistor, and a sixth p-channel transistor. Each of the plurality of n-channel transistors comprises a first terminal, a gate terminal, and a second terminal. The first terminal of the first p-channel transistor may be coupled to the first n-well and configured to receive the first input signal, and the gate terminal of the first p-channel transistor may be coupled to the counter and configured to receive an inverted version of a first address bit of the set of address bits. The first terminal of the second p-channel transistor may be coupled to the second n-well and configured to receive a second input signal of the plurality of input signals, and the gate terminal of the second p-channel transistor may be coupled to the counter and configured to receive the first address bit. The first terminal of the third p-channel transistor may be coupled to the third n-well and configured to receive a third input signal of the plurality of input signals, and the gate terminal of the third p-channel transistor may be coupled to the counter and configured to receive the inverted version of the first address bit. The first terminal of the fourth p-channel transistor may be coupled to the fourth n-well and configured to receive a fourth input signal of the plurality of input signals, and the gate terminal of the fourth p-channel transistor may be coupled to the counter and configured to receive the first address bit. The first terminal of the fifth p-channel transistor may be coupled to the second terminal of the first p-channel transistor and the second terminal of the second p-channel transistor, and the gate terminal of the fifth p-channel transistor may be coupled to the counter and configured to receive an inverted version of a second address bit of the set of address bits. The first terminal of the sixth p-channel transistor may be coupled to the second terminal of the third p-channel transistor and the second terminal of the fourth p-channel transistor, the gate terminal of the sixth p-channel transistor may be coupled to the counter and configured to receive the second address bit, and the second terminal of the sixth p-channel transistor may be coupled to the second terminal of the fifth p-channel transistor to output at least one of a group consisting of the first input signal, the second input signal, the third input signal, and the fourth input signal.

In some embodiments, the IC may further comprise a clock generator coupled to the counter, wherein the clock generator may be configured to generate the clock signal.

In some embodiments, the IC may further comprise an address register coupled to the clock generator and the counter, wherein the address register may be configured to receive the select signal, the clock signal, and the fault signal, and generate an address signal. The address signal is indicative of the first location when the fault signal is at the first state.

In some embodiments, the detection circuit may comprise a comparison circuit, wherein the comparison circuit may comprise a reference voltage generator configured to receive a supply voltage and generate the threshold signal. The comparison circuit may further comprise a comparator, wherein the comparator may comprise (i) a non-inverting terminal configured to receive the first input signal and (ii) an inverting terminal coupled to the reference voltage generator. The comparator may be configured to receive the threshold signal and generate the fault signal based on comparison of the first input signal with the threshold signal. The fault signal is generated at the first state when a level of the first input signal is one of (i) exceeds and (ii) remains below a level of the threshold signal.

In some embodiments, the reference voltage generator may comprise a plurality of resistors, wherein a first resistor of the plurality of resistors has a first terminal coupled to a ground terminal. A second resistor of the plurality of resistors has a first terminal configured to receive the supply voltage, wherein a second terminal of the second resistor may be coupled to a second terminal of the first resistor to generate the threshold signal.

In some embodiments, the reference voltage generator may comprise a current generator having a first end that may be configured to receive the supply voltage and generate a first current signal. The reference voltage generator may further comprise a resistor that may have a first terminal coupled to a ground terminal and a second terminal coupled to a second end of the current generator to generate the threshold signal.

In some embodiments, the reference voltage generator may comprise a resistor, wherein the resistor may have a first terminal that may be configured to receive the supply voltage. The reference voltage generator may further comprise a current generator having a first end that may be coupled to a ground terminal and configured to generate a first current signal. The current generator may further have a second end coupled to a second terminal of the resistor and configured to generate the threshold signal.

In some embodiments, the detection circuit may comprise a comparison circuit, wherein the comparison circuit may comprise a reference voltage generator configured to receive a supply voltage and generate the threshold signal. The comparison circuit may further comprise a comparator, wherein the comparator may comprise (i) an inverting terminal configured to receive the first input signal and (ii) a non-inverting terminal coupled to the reference voltage generator. The comparator may be configured to receive the threshold signal and generate the fault signal based on comparison of the first input signal with the threshold signal. The fault signal is generated at the first state when a level of the first input signal is one of (i) exceeds and (ii) remains below a level of the threshold signal.

In some embodiments, the detection circuit may further comprise a comparison circuit, wherein the comparison circuit may comprise an operational amplifier. The operational amplifier may comprise (i) an inverting terminal configured to receive the first input signal, (ii) a non-inverting terminal coupled to a ground terminal, (iii) a first output terminal coupled to the inverting terminal of the operational amplifier in a negative feedback configuration and that may be configured to output a current signal, and (iv) a second output terminal that may be configured to replicate the current signal at the first output terminal of the operational amplifier. The comparison circuit may further comprise a reference current generator, wherein the reference current generator may have a first end coupled to the second output terminal of the operational amplifier, and a second end that may be configured to receive a supply voltage. The second end may be configured to generate the threshold signal. The comparison circuit may further comprise an inverter, wherein the inverter may comprise an input terminal that may be coupled to the second output terminal of the operational amplifier and configured to receive the current signal and the threshold signal, and generate the fault signal. The fault signal is generated at the first state when a level of the current signal is one of (i) exceeds and (ii) remains below a level of the threshold signal.

In some embodiments, the detection circuit may further comprise a comparison circuit, wherein the comparison circuit may comprise an operational amplifier. The operational amplifier may comprise (i) an inverting terminal configured to receive the first input signal, (ii) a non-inverting terminal configured to receive a supply voltage, (iii) a first output terminal coupled to the inverting terminal of the operational amplifier in a negative feedback configuration, and may be configured to output a current signal, and (iv) a second output terminal that may be configured to replicate the current signal at the first output terminal of the operational amplifier. The comparison circuit may further comprise a reference current generator, wherein the reference current generator may have a first end that may be coupled to the second output terminal of the operational amplifier and a second end that may be coupled to a ground terminal and configured to generate the threshold signal. The comparison circuit may further comprise a buffer, wherein the buffer may comprise an input terminal that may be coupled to the second output terminal of the operational amplifier and the reference current generator and configured to receive the first current signal and the threshold signal and generate the fault signal. The fault signal is generated at the first state when a level of the current signal is one of (i) exceeds and (ii) remains below a level of the threshold signal.

In some embodiments, the IC may further comprise a fault collection and control management circuit that may be configured to receive the fault signal and an address signal indicative of the first location when the fault signal is at the first state. The fault collection and control management circuit may be further configured to detect, based on the first state of the fault signal, the SEL in the first well, and determine a set of actions based on the detection of the SEL in the first well.

In some embodiments, the set of actions includes at least one of a group consisting of resetting the IC, switching off the IC, and disabling a system clock signal provided to the IC.

In some embodiments, the plurality of wells comprise a plurality of p-wells and a plurality of n-wells such that at least one of a group consisting of (i) a plurality of n-channel transistors and (ii) a plurality of p-channel transistors is formed in the plurality of p-wells and the plurality of n-wells, wherein the plurality of n-channel transistors and the plurality of p-channel transistors form a memory cell of the memory circuit. The memory cell may be configured to store a data bit.

In some embodiments, the SEL occurs based on at least one of a group consisting of a neutron particle injection, an alpha radiation, and a laser fault injection.

In some embodiments, the plurality of input signals correspond to at least one of a group consisting of (i) a plurality of voltage signals and (ii) a plurality of current signals.

In another embodiment, a latch-up detection method may comprise generating, by a plurality of wells of a memory circuit of an integrated circuit (IC), a plurality of input signals, wherein a first input signal of the plurality of input signals is generated by a first well of the plurality of wells. The latch-up detection method may further comprise periodically scanning, by a detection circuit of the IC, based on a select signal, the plurality of wells, wherein the select signal is indicative of a location of each well of the plurality of wells. The latch-up detection method may further comprise selecting, by the detection circuit, the first input signal when the select signal indicates a first location of the first well. The latch-up detection method may further comprise comparing, by the detection circuit, a level of the first input signal with a level of the threshold signal to generate a fault signal, wherein the threshold signal is indicative of a Single Event Latch-up (SEL). The latch-up detection method may further comprise detecting, by the detection circuit, based on a first state of the fault signal, the SEL in the first well indicative of a fault in the memory circuit.

In the present disclosure, the term "assert" is used to mean placing a signal in an active state. Some signals may be assert-high signals whereas some signals may be assert-low signals. With assert-high signals, the assertion of a signal corresponds to the signal being in a logic high state. Conversely, with assert-low signals, the assertion of a signal corresponds to the signal being in a logic low state.

While various embodiments of the present disclosure have been illustrated and described, it will be clear that the present disclosure is not limited to these embodiments only. Numerous modifications, changes, variations, substitutions, and equivalents will be apparent to those skilled in the art, without departing from the spirit and scope of the present disclosure, as described in the claims. Further, unless stated otherwise, terms such as "first" and "second" are used to arbitrarily distinguish between the elements such terms describe. Thus, these terms are not necessarily intended to indicate temporal or other prioritization of such elements.

We claim:

1. An integrated circuit (IC), comprising:
    a plurality of wells in a memory circuit configured to generate a plurality of input signals, wherein a first well of the plurality of wells is configured to generate a first input signal of the plurality of input signals; and
    a detection circuit coupled to the plurality of wells, wherein the detection circuit is configured to:
        periodically scan, based on a select signal, the plurality of wells, wherein the select signal is indicative of a location of each well of the plurality of wells;
        select the first input signal when the select signal indicates a first location of the first well;
        compare, the first input signal with a threshold signal to generate a fault signal, wherein the threshold signal is indicative of a Single Event Latch-up (SEL); and
        detect, based on a first state of the fault signal, the SEL in the first well indicative of a fault in the memory circuit.

2. The IC of claim 1, wherein the detection circuit comprises a selection circuit, and wherein the selection circuit comprises:
    a counter configured to receive a clock signal and generate the select signal based on the clock signal, wherein the periodic scanning is based on a frequency of the clock signal and a count of wells in the plurality of wells; and a scanning multiplexer coupled to the counter and the plurality of wells, wherein the scanning multiplexer is configured to:
periodically scan, based on the select signal, the plurality of wells; and
select the first input signal when the select signal indicates the first location.

3. The IC of claim 2, wherein the select signal comprises a set of address bits, and wherein when the set of address bits is indicative of the first location, the first input signal is selected.

4. The IC of claim 3, wherein the plurality of wells comprises a plurality of p-wells, wherein the plurality of p-wells comprises a first p-well, a second p-well, a third p-well, and a fourth p-well, wherein the first p-well corresponds to the first well, and wherein the scanning multiplexer comprises a plurality of n-channel transistors coupled to the plurality of p-wells, wherein the plurality of n-channel transistors comprise a first n-channel transistor, a second n-channel transistor, a third n-channel transistor, a fourth n-channel transistor, a fifth n-channel transistor, and a sixth n-channel transistor, wherein each of the plurality of n-channel transistors comprises a first terminal, a gate terminal, and a second terminal, wherein the first terminal of the first n-channel transistor is coupled to the first p-well and configured to receive the first input signal, and the gate terminal of the first n-channel transistor is coupled to the counter and configured to receive an inverted version of a first address bit of the set of address bits, wherein the first terminal of the second n-channel transistor is coupled to the second p-well and configured to receive a second input signal of the plurality of input signals, and the gate terminal of the second n-channel transistor is coupled to the counter and configured to receive the first address bit of the set of address bits, wherein the first terminal of the third n-channel transistor is coupled to the third p-well and configured to receive a third input signal of the plurality of input signals, and the gate terminal of the third n-channel transistor is coupled to the counter and configured to receive the inverted version of the first address bit, wherein the first terminal of the fourth n-channel transistor is coupled to the fourth p-well and configured to receive a fourth input signal of the plurality of input signals, and the gate terminal of the fourth n-channel transistor is coupled to the counter and configured to receive the first address bit, wherein the first terminal of the fifth n-channel transistor is coupled to the second terminal of the first n-channel transistor and the second terminal of the second n-channel transistor, and the gate terminal of the fifth n-channel transistor is coupled to the counter and configured to receive an inverted version of a second address bit of the set of address bits, and wherein the first terminal of the sixth n-channel transistor is coupled to the second terminal of the third n-channel transistor and the second terminal of the fourth n-channel transistor, the gate terminal of the sixth n-channel transistor is coupled to the counter and configured to receive the second address bit, and the second terminal of the sixth n-channel transistor is coupled to the second terminal of the fifth n-channel transistor to output at least one of a group consisting of the first input signal, the second input signal, the third input signal, and the fourth input signal.

5. The IC of claim 3, wherein the plurality of wells comprise a plurality of n-wells, wherein the plurality of n-wells comprise a first n-well, a second n-well, a third n-well, and a fourth n-well, wherein the first n-well corresponds to the first well, and wherein the scanning multiplexer comprises:

a plurality of p-channel transistors coupled to the plurality of n-wells, wherein the plurality of p-channel transistors comprise a first p-channel transistor, a second p-channel transistor, a third p-channel transistor, a fourth p-channel transistor, a fifth p-channel transistor, and a sixth p-channel transistor, wherein each of the plurality of p-channel transistors comprises a first terminal, a gate terminal, and a second terminal, wherein the first terminal of the first p-channel transistor is coupled to the first n-well and configured to receive the first input signal, and the gate terminal of the first p-channel transistor is coupled to the counter and configured to receive an inverted version of a first address bit of the set of address bits, wherein the first terminal of the second p-channel transistor is coupled to the second n-well and configured to receive a second input signal of the plurality of input signals, and the gate terminal of the second p-channel transistor is coupled to the counter and configured to receive the first address bit, wherein the first terminal of the third p-channel transistor is coupled to the third n-well and configured to receive a third input signal of the plurality of input signals, and the gate terminal of the third p-channel transistor is coupled to the counter and configured to receive the inverted version of the first address bit, wherein the first terminal of the fourth p-channel transistor is coupled to the fourth n-well and configured to receive a fourth input signal of the plurality of input signals, and the gate terminal of the fourth p-channel transistor is coupled to the counter and configured to receive the first address bit, wherein the first terminal of the fifth p-channel transistor is coupled to the second terminal of the first p-channel transistor and the second terminal of the second p-channel transistor, and the gate terminal of the fifth p-channel transistor is coupled to the counter and configured to receive an inverted version of a second address bit of the set of address bits, and wherein the first terminal of the sixth p-channel transistor is coupled to the second terminal of the third p-channel transistor and the second terminal of the fourth p-channel transistor, the gate terminal of the sixth p-channel transistor is coupled to the counter and configured to receive the second address bit, and the second terminal of the sixth p-channel transistor is coupled to the second terminal of the fifth p-channel transistor to output at least one of a group consisting of the first input signal, the second input signal, the third input signal, and the fourth input signal.

6. The IC of claim 2, further comprising a clock generator coupled to the counter, wherein the clock generator is configured to generate the clock signal.

7. The IC of claim 6, further comprising an address register coupled to the clock generator and the counter, wherein the address register is configured to receive the select signal, the clock signal, and the fault signal, and generate an address signal, and wherein the address signal is indicative of the first location when the fault signal is at the first state.

8. The IC of claim 1, wherein the detection circuit comprises a comparison circuit, and wherein the comparison circuit comprises:
a reference voltage generator configured to receive a supply voltage and generate the threshold signal; and
a comparator comprising:
(i) a non-inverting terminal configured to receive the first input signal; and
(ii) an inverting terminal coupled to the reference voltage generator, and configured to receive the threshold signal and generate the fault signal based on comparison of the first input signal with the threshold signal, wherein the fault signal is generated at the first state when a level of the first input signal is one of (i) exceeds and (ii) remains below a level of the threshold signal.

9. The IC of claim 8, wherein the reference voltage generator comprises a plurality of resistors, wherein a first resistor of the plurality of resistors has a first terminal coupled to a ground terminal,
wherein a second resistor of the plurality of resistors has a first terminal configured to receive the supply voltage, and
wherein a second terminal of the second resistor is coupled to a second terminal of the first resistor and configured to generate the threshold signal.

10. The IC of claim 8, wherein the reference voltage generator comprises:
a current generator having a first end configured to receive the supply voltage and generate a first current signal; and
a resistor having a first terminal coupled to a ground terminal and a second terminal coupled to a second end of the current generator and configured to generate the threshold signal.

11. The IC of claim 8, wherein the reference voltage generator comprises:
a resistor having a first terminal configured to receive the supply voltage; and
a current generator having a first end that is coupled to a ground terminal and configured to generate a first current signal, and a second end coupled to a second terminal of the resistor and configured to generate the threshold signal.

12. The IC of claim 1, wherein the detection circuit comprises a comparison circuit, and wherein the comparison circuit comprises:
a reference voltage generator configured to receive a supply voltage and generate the threshold signal; and
a comparator comprising:
(i) an inverting terminal configured to receive the first input signal; and
(ii) a non-inverting terminal coupled to the reference voltage generator, and configured to receive the threshold signal and generate the fault signal based on comparison of the first input signal with the threshold signal, wherein the fault signal is generated at the first state when a level of the first input signal is one of (i) exceeds and (ii) remains below a level of the threshold signal.

13. The IC of claim 1, wherein the detection circuit further comprises a comparison circuit, and wherein the comparison circuit comprises:

an operational amplifier comprising:
(i) an inverting terminal configured to receive the first input signal;
(ii) a non-inverting terminal coupled to a ground terminal;
(iii) a first output terminal coupled to the inverting terminal of the operational amplifier in a negative feedback configuration, and configured to output a current signal; and
(iv) a second output terminal configured to replicate the current signal at the first output terminal of the operational amplifier;
a reference current generator having a first end coupled to the second output terminal of the operational amplifier, and a second end configured to receive a supply voltage and generate the threshold signal; and
an inverter comprising an input terminal coupled to the second output terminal of the operational amplifier and configured to receive the current signal and the threshold signal and generate the fault signal, wherein the fault signal is generated at the first state when a level of the current signal is one of (i) exceeds and (ii) remains below a level of the threshold signal.

14. The IC of claim 1, wherein the detection circuit further comprises a comparison circuit, and wherein the comparison circuit comprises:
an operational amplifier comprising:
(i) an inverting terminal configured to receive the first input signal;
(ii) a non-inverting terminal configured to receive a supply voltage;
(iii) a first output terminal coupled to the inverting terminal of the operational amplifier in a negative feedback configuration, and configured to output a current signal; and
(iv) a second output terminal configured to replicate the current signal at the first output terminal of the operational amplifier;
a reference current generator having a first end coupled to the second output terminal of the operational amplifier and a second end coupled to a ground terminal and configured to generate the threshold signal; and
a buffer comprising an input terminal coupled to the second output terminal of the operational amplifier and the reference current generator and configured to receive the current signal and the threshold signal and generate the fault signal, wherein the fault signal is generated at the first state when a level of the current signal is one of (i) exceeds and (ii) remains below a level of the threshold signal.

15. The IC of claim 1, further comprising:
a fault collection and control management circuit configured to:
receive the fault signal and an address signal indicative of the first location when the fault signal is at the first state;
detect, based on the first state of the fault signal, the SEL in the first well; and
determine a set of actions based on a detection of the SEL in the first well.

16. The IC of claim 15, wherein the set of actions includes at least one of a group consisting of resetting the IC, switching off the IC, and disabling a system clock signal provided to the IC.

17. The IC of claim 1, wherein the plurality of wells comprise a plurality of p-wells and a plurality of n-wells such that at least one of a group consisting of (i) a plurality of n-channel transistors and (ii) a plurality of p-channel transistors is formed in the plurality of p-wells and the plurality of n-wells, wherein the plurality of n-channel transistors and the plurality of p-channel transistors form a memory cell of the memory circuit, and wherein the memory cell is configured to store a data bit.

18. The IC of claim 1, wherein the SEL occurs based on at least one of a group consisting of a neutron particle injection, an alpha radiation, and a laser fault injection.

19. The IC of claim 1, wherein the plurality of input signals correspond to at least one of a group consisting of (i) a plurality of voltage signals and (ii) a plurality of current signals.

20. A latch-up detection method comprising:
generating, by a plurality of wells of a memory circuit of an integrated circuit (IC), a plurality of input signals, wherein a first input signal of the plurality of input signals is generated by a first well of the plurality of wells;
periodically scanning, by a detection circuit of the IC, based on a select signal, the plurality of wells, wherein the select signal is indicative of a location of each well of the plurality of wells;
selecting, by the detection circuit, the first input signal when the select signal indicates a first location of the first well;
comparing, by the detection circuit, a level of the first input signal with a level of a threshold signal to generate a fault signal, wherein the threshold signal is indicative of a single event latch-up (SEL); and
detecting, by the detection circuit, based on a first state of the fault signal, the SEL in the first well indicative of a fault in the memory circuit.

* * * * *